US012353357B2

(12) United States Patent
Glon et al.

(10) Patent No.: US 12,353,357 B2
(45) Date of Patent: Jul. 8, 2025

(54) SYSTEMS AND METHODS FOR FORMATTING AND RECONSTRUCTING RAW DATA

(71) Applicant: OVH, Roubaix (FR)

(72) Inventors: Raphael Glon, Guilers (FR); Gaetan Cottereau, Kersaint-Plabennec (FR)

(73) Assignee: OVH, Roubaix (FR)

( * ) Notice: Subject to any disclaimer, the term of this patent is extended or adjusted under 35 U.S.C. 154(b) by 347 days.

(21) Appl. No.: 17/308,159

(22) Filed: May 5, 2021

(65) Prior Publication Data

US 2021/0374102 A1    Dec. 2, 2021

(30) Foreign Application Priority Data

May 28, 2020 (EP) .................................... 20315273

(51) Int. Cl.
*G06F 16/17* (2019.01)
*G06F 16/11* (2019.01)

(52) U.S. Cl.
CPC ........ *G06F 16/1727* (2019.01); *G06F 16/122* (2019.01)

(58) Field of Classification Search
None
See application file for complete search history.

(56) References Cited

U.S. PATENT DOCUMENTS

| | | | |
|---|---|---|---|
| 9,811,545 B1 * | 11/2017 | Bent | G06F 16/2228 |
| 10,108,647 B1 * | 10/2018 | Kumar | G06F 16/183 |
| 10,346,362 B2 * | 7/2019 | Tao | G06F 16/1744 |
| 10,831,398 B2 * | 11/2020 | Barzik | G06F 3/064 |
| 10,860,533 B1 * | 12/2020 | Neilsen | G06F 16/14 |
| 2008/0059398 A1 * | 3/2008 | Tsutsui | G06F 16/116 |
| 2011/0055273 A1 * | 3/2011 | Resch | G06F 3/0622 707/802 |
| 2020/0019535 A1 * | 1/2020 | Parker | G06F 16/176 |
| 2020/0183886 A1 * | 6/2020 | Wang | G06F 16/1744 |

OTHER PUBLICATIONS

Extended European Search Report with regard to the EP Patent Application No. 20315273.1 mailed Nov. 20, 2020.

(Continued)

*Primary Examiner* — Neveen Abel Jalil
*Assistant Examiner* — John J Morris
(74) *Attorney, Agent, or Firm* — BCF LLP

(57) ABSTRACT

A method for formatting raw data comprises accessing the raw data, the raw data comprising sparse data segments, which are empty of any data, and non-sparse data segments, which comprise data, and generating a formatted data stream comprising one or more atomic blocks, each atomic block corresponding to a metadata file and to a portion of the non-sparse data segments of the raw data. Generating one atomic block comprises browsing the raw data and, upon locating one sparse data segment, populating the corresponding metadata file with offsets indicative of a beginning and an end of the located sparse data segment and populating the atomic block with a concatenation of at least portions of the non-sparse segments of the raw data located before and after the located sparse segment. If the atomic block exceeds a maximum size, another atomic block and another corresponding metadata file are populated.

12 Claims, 20 Drawing Sheets

(56) References Cited

OTHER PUBLICATIONS

Wikipedia, "Disk Image", Apr. 26, 2020, retrieved on Nov. 10, 2020, pdf 7 pages.
Wikipedia, "Sparse File", May 11, 2020, retrieved on Nov. 10, 2020, pdf 4 pages.
Wikipedia, "Split (Unix)", May 11, 2020, retrieved on Nov. 10, 2020, pdf 3 pages.
"The .xz File Format", retrieved on https://tukaani.org/xz/xz-file-format.txt on May 4, 2021, pdf 18 pages.
Hocevar, retrieved on https://gist.githubusercontent.com/kempniu/30c7fa2c1825cde80040/raw/7799c6708e89c4646a68f338d2ed3238688d5321/sparsify.c on May 4, 2021, pdf 2 pages.
"QEMU Disk Network Block Device Server", retrieved on https://www.mankier.com/8/qemu-nbd on May 4, 2021, pdf 6 pages.
Jones, "Streaming NBD server", retrieved on https://web.archive.org/web/20191202200236/https://rwmj.wordpress.com/2014/10/14/streaming-nbd-server/ on May 4, 2021, pdf 3 pages.
"Enhance importer to use qemu-img pseudo streaming to save /tmp step", retrieved on https://github.com/kubevirt/containerized-data-importer/issues/254 on May 4, 2021, pdf 3 pages.
"Linux manual page", retrieved on http://man7.org/linux/man-pages/man2/fallocate.2.html on May 4, 2021, pdf 6 pages.
"Hypertext Transfer Protocol", retrieved on https://tools.ietf.org/html/rfc7233 on May 4, 2021, pdf 26 pages.
European Communication with regard to the EP Patent Application No. 20315273.1 mailed Aug. 10, 2023.
Anonymous: "Converting sparse file to non-sparse in place—Unix & Linux Stack Exchange", Nov. 24, 2014 (Nov. 24, 2014), XP093070812, Retrieved from the Internet: URL: https://unix.stackexchange.com/questions/169669/converting-sparse-file-to-non-sparse-in-place retrieved on Aug. 4, 2023.
Anonymous: "cp(1): copy files/directories—Linux man page", Jul. 12, 2007 (Jul. 12, 2007), XP093070808, Retrieved from the Internet: URL: https://web.archive.org/web/20070712184940/https://linux.die.net/man/1/cp retrieved on Aug. 4, 2023.
Anonymous: "sparse-fio/README.md at d7efae44cf0aa75be2c2bdc02346549b23579557.anyc/sparse-fio.GitHub", Jul. 27, 2019 (Jul. 27, 2019), XP093070535, Retrieved from the Internet: URL: https://github.com/anyc/sparse-fio/blob/d7efae44cf0aa75be2c2bdc02346549b23579557/README.md retrieved on Aug. 4, 2023.
Anonymous: "History for README.md—anyc/sparse-fio . GitHub", Jul. 27, 2019 (Jul. 27, 2019), XP093070581—(proof of publication date of D7)—Retrieved from the Internet: URL: https://github.com/anyc/sparse-fio/commits/defae44cf0aa75be2c2bdc02346549b23579557/README.md retrieved on Aug. 14, 2023.

* cited by examiner

SYSTEMS AND METHODS FOR FORMATTING AND RECONSTRUCTING RAW DATA

CROSS-REFERENCE

The present application claims priority from European Patent Application No. 20315273.1, entitled "Systems and Methods for Formatting and Reconstructing Raw Data," filed on May 28, 2020, the entirety of which is incorporated herein by reference.

FIELD

The present technology relates to systems and methods for formatting raw data, and more particularly, to systems and methods for formatting raw data and for reconstructing raw data.

BACKGROUND

Operating datacenters, for example in the context of rendering cloud-related services, typically requires managing a very large number of hardware equipment. Such hardware equipment may comprise servers, networking devices (switch, rooters, etc.), CPUs, disk memory, etc. As part of a service offering, cloud-services may be rendered in the form of providing access to Virtual Machines (VM) which allow clients/users to use common hardware equipment while emulating dedicated computer systems. For various reasons (e.g., security, privacy, etc), clients/users may desire to rely on dedicated hardware equipment (i.e., dedicated physical computer systems) to operate their cloud-based services. Such approach may be referred to as providing "bare-metal" servers as it conveys the notion of physical hardware equipment dedicated to a client or to a restricted group of users. This approach may be deemed in contrast with fully virtualized approaches wherein mutualized physical hardware equipment may be relied upon to emulate one or more VMs.

Providing access to "bare metal" servers may require pre-configuration and/or installation of software components before the computer system may be ready to be used by the client/user. As an example, an Operating System (OS) may need to be deployed upon request on the computer system. To that end, in accordance with non-limiting approaches, raw data representing a disk image on which an OS is installed may be transferred from a server via a network, reconstructed and deployed on the computer system dedicated to the client/user. Given the large size of such disk images (e.g., 800 Go), transferring, reconstructing and deploying the disk image may be a time and/or resource consuming task.

Improvements are therefore desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise, without being limitative, (1) slow formatting of the raw data; (2) low compression ratio, and/or (3) slow reconstructing of the raw data.

In one aspect, various implementations of the present technology provide a method for formatting raw data, the method including accessing the raw data, the raw data comprising sparse data segments and non-sparse data segments, the sparse data segments being empty of any data, the non-sparse data segments comprising data; generating a formatted data stream comprising one or more atomic blocks from the raw data, each of the one or more atomic blocks being associated with a metadata file, each one of the one or more atomic blocks comprising at least a portion of the non-sparse data segments of the raw data, generating the one or more atomic blocks comprising browsing the raw data to locate sparse data segments and, upon locating one of the sparse data segments, executing: if one of the atomic blocks does not exceed a maximum size: populating the metadata file of the one of the atomic blocks with offsets indicative of a beginning of the located sparse data segment and an end of the located sparse data segment; and populating the one of the atomic blocks with a concatenation of at least a portion of a first non-sparse segment of the raw data located before the sparse segment with at least a portion of the second non-sparse data segment of the raw data located after the sparse data segment; if one of the atomic blocks exceeds the maximum size: populating the metadata file of another one of the atomic blocks with offsets indicative of the beginning of the located sparse data segment and the end of the located sparse data segment; and populating the other one of the atomic blocks with a concatenation of the at least a portion of the first non-sparse data segment of the raw data located before the sparse data segment with the at least a portion of the second non-sparse data segment of the raw data located after the sparse data segment.

In some implementations of the present technology, each of the one or more atomic block comprises a size of the concatenation of the non-sparse data segment populated in the corresponding atomic block.

In some implementations of the present technology, the raw data are reconstructed from the formatted data stream, the reconstructing being based on the one or more atomic blocks, the reconstructing including browsing the offsets of the metadata file of the one or more atomic blocks; reconstructing the raw data by iterating, up until the raw data is reconstructed, the steps of: if determination is made, based on the offsets of the metadata file of the one or more atomic blocks, that a non-sparse data segment is to be reconstructed, writing a corresponding data content of the portion of the non-sparse data segment contained in the one or more atomic blocks; and if determination is made, based on the offsets of the metadata file of the one or more atomic blocks, that a sparse data segment is to be reconstructed, executing a command to define a block of zero which size corresponds to a size of the sparse data segment.

In some implementations of the present technology, the formatted data stream is streamed from a first data storage device to a second data storage device while the formatting of the raw data and the reconstructing of the raw data are being executed in parallel.

In some implementations of the present technology, the first data storage device and the second data storage device are selected from a group of data storage device comprising: hard drives, physical drives, logic drives, disks and solid state-drives (SSD).

In some implementations of the present technology, the formatting of the raw data is executed on the content of the first data storage device and the reconstructing of the raw data is stored in the second data storage device.

In some implementations of the present technology, wherein the raw data comprises a disk-image containing a content and/or a structure of an entire data storage device.

In some implementations of the present technology, the raw data comprises data blocks and is reconstructed on a block device and the command to define a block of zero which size corresponds to the size of the sparse segment is associated with the block device.

In some implementations of the present technology, subsequent to generating the formatted data stream, a compression algorithm on the formatted data stream is executed.

In some implementations of the present technology, prior to reconstructing the raw data from the formatted data stream, a decompression algorithm associated with the compression algorithm on the compressed and formatted data stream is executed.

In some implementations of the present technology, generating the formatted data stream further comprises generating a footer, the footer comprising one or more of the following values: a value relating to a number of the one or more atomic blocks, a number of read bytes of the raw data, a number of written bytes including written bytes of the offsets file and the footer, and/or a ratio between the number of read bytes and the number of written bytes.

In other aspects, various implementations of the present technology provide a method for formatting raw data, the method including accessing the raw data, the raw data comprising sparse data segments and non-sparse data segments, the sparse data segments being empty of any data, the non-sparse data segments comprising data; generating a formatted data stream from the raw data, the formatted data stream comprising the non-sparse data segments of the raw data, the generating the formatted data stream comprising browsing the raw data to locate sparse data segments and, upon locating one of the sparse data segments, executing: populating a metadata file with offsets indicative of a beginning of the located sparse data segment and an end of the located sparse data segment; and concatenating a first non-sparse segment of the file located before the sparse data segment with a second non-sparse data segment of the file located after the sparse data segment.

In some implementations of the present technology, the raw data are reconstructed from the formatted data stream, the reconstructing being based on the metadata file, the reconstructing including browsing the offsets of the metadata file; reconstructing the raw data by iterating, up until the raw data is reconstructed, the steps of: if determination is made, based on the offsets of the metadata file, that a non-sparse segment is to be reconstructed, writing a corresponding data content of the non-sparse data segment; and if determination is made, based on the offsets of the metadata file, that a sparse data segment is to be reconstructed, executing a command to define a block of zero which size corresponds to a size of the sparse data segment.

In some implementations of the present technology, the offsets of the metadata file are concatenated to the formatted data stream.

In other aspects, various implementations of the present technology provide a networking device for Operating System (OS) deployment on a bare-metal server using raw data of a first server.

In some implementations of the present technology, the maximum size relating to the atomic block is set equal to a size of a data storage device of the bare-metal server.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
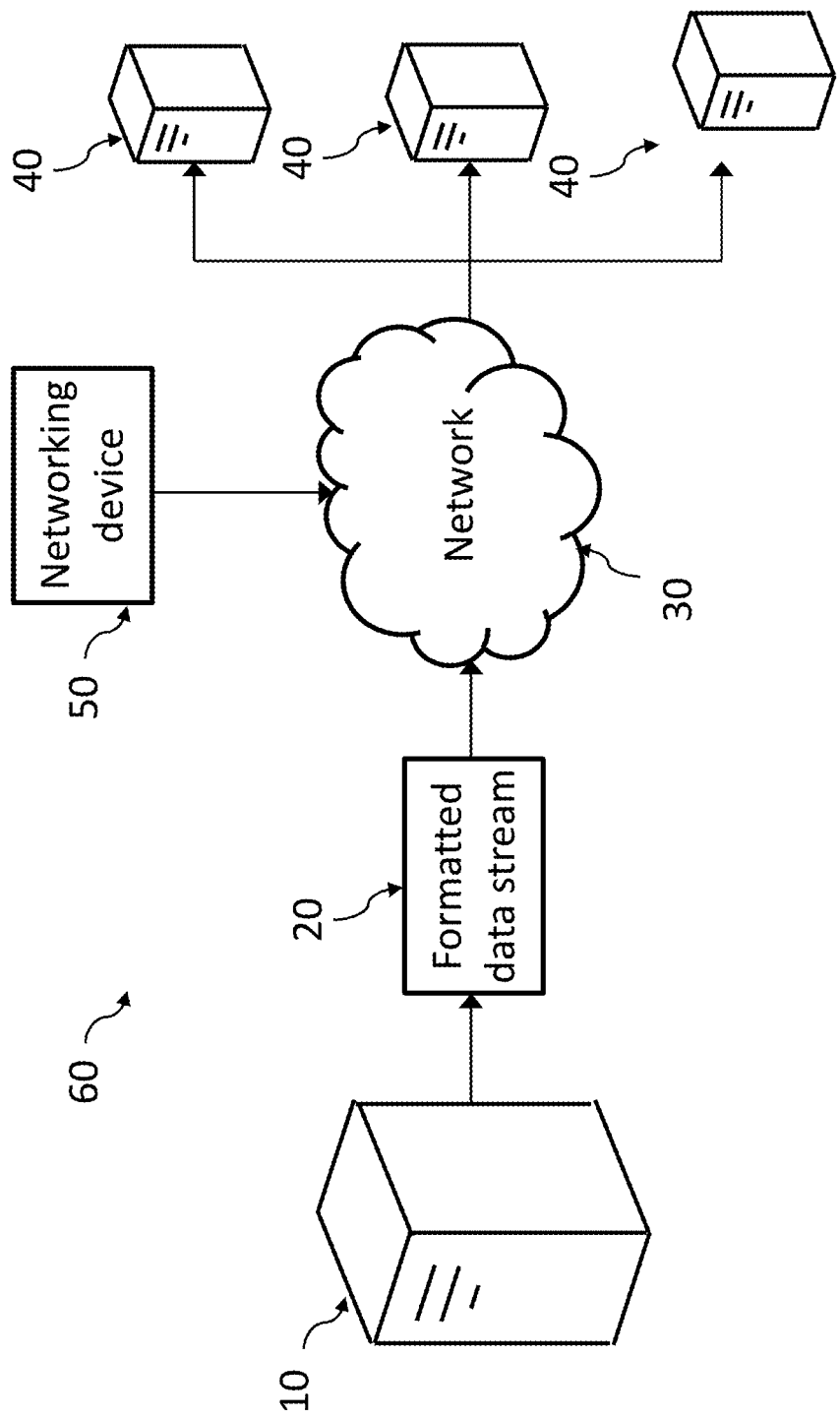
FIG. 1 is a diagram of a computing environment in accordance with embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "server", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, Random-Access Memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology provides a tool for data cloning and data backup. In order to guarantee reliability, cloud operating system providers perform data backups on a regular basis. In the case of an allocated bare-metal server for a client, such data backups are called snapshots. A snapshot of a server is a copy of the data contained in said server. Such snapshots are also used in the deployment of an Operating System (OS). To deploy an OS, a snapshot of a first server is performed to generate a disk-image containing the OS of the first server, then the disk-image is transferred to the allocated server of the client which process the disk-image to deploy the OS on the allocated server of the client. The process of formatting and reconstructing raw data to generate the disk-image and deploy the OS will be described hereinafter.

With these fundamentals in place, we will now consider some non-limiting examples to illustrate various implementations of aspects of the present technology.

Various aspects of the present technology generally address one or more of the problems found in conventional computer-implemented data compression and decompression systems, notably for OS deployment in bare-metal servers of cloud operating systems providers. To this end, the present technology, amongst other aspects, introduces a method for generating a formatted disk-image of the OS and stream the formatted disk-image to deploy the operating system on a bare-metal server. The formatted disk-image being streamable, the reconstructing of the disk-image while it is being received by the bare-metal server. This is in contrast with non-streamable disk-images or non-streamable files which require that an entirety of the disk-images and/or files be first stored in a memory of the bare-metal server before the reconstructing may be begin. Therefore, the size of non-streamable disk-images or non-streamable files that can be reconstructed are limited by the size of a memory of the bare-metal server.

FIG. 1 illustrates a diagram of a computing environment 60 in accordance with an embodiment of the present technology. A server 10 is configured to initiate a snapshot of its OS and generates a formatted data stream 20 relating to the operating system upon receipt of a command from a networking device 50. In one embodiment, the formatted data stream 20 contains a disk-image of the server 10. Therefore, the formatted data stream 20 may comprise the raw data comprised in a disk drive or the like of the server 10 at the time of the initiation of the snapshot. The formatted data stream 20 is transferred by a networking device 50, via a network 30, to one or more servers 40. Each one of the one or more servers 40 may be allocated as a bare-metal server for a client. The one or more servers 40 are configured to receive the formatted data stream 20 an reconstruct the raw data to deploy the OS contained in the formatted data stream 20. The generation of the formatted data stream and the reconstruction of the raw data will be described hereinafter.

The person skilled in the art will appreciate that a disk-image comprised in the formatted data stream 20 may be stored in a memory (not shown) as a backup of the disk drive or the like of the server 10.

Although three servers 40 are represented on FIG. 1, the computing environment 60 may comprise a different number of second server 40. This aspect is not limitative.

Figure 2A:
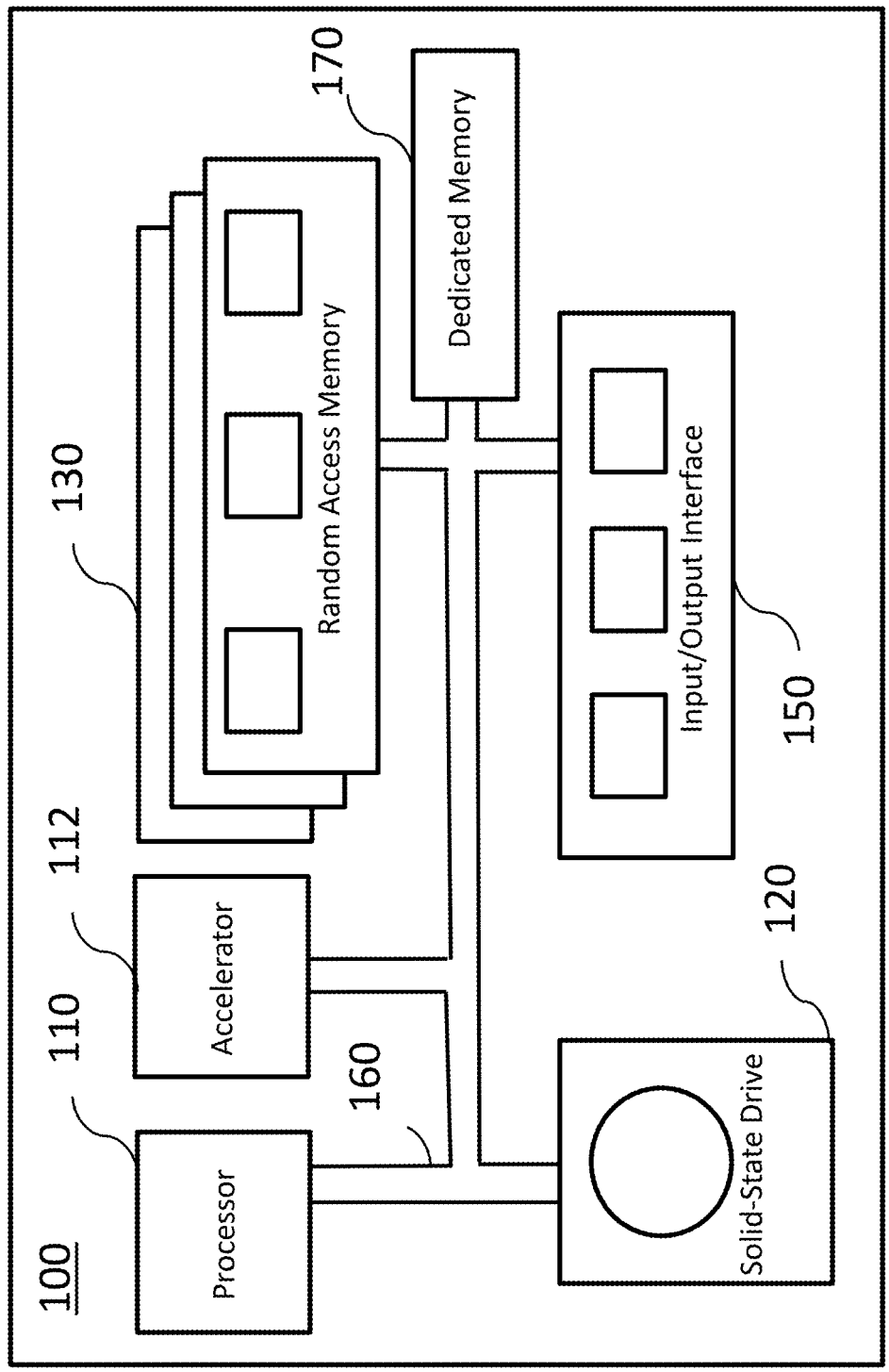
FIGS. 2A and 2B illustrate examples of computer systems that may be used to implement any of the methods described herein.

FIG. 2A illustrates a diagram of a computing system 100 in accordance with an embodiment of the present technology. In some embodiments, the computing system 100 may be implemented by any of a conventional personal computer, a server, a router, a switch, a controller, and/or an electronic device (e.g., a server, a controller unit, a control device, a monitoring device etc.) and/or any combination thereof appropriate to the relevant task at hand. In particular, the computing system may be implemented as the server 10, the one or more servers 40 and/or the networking device 50. In some embodiments, the computing system 100 comprises various hardware components including one or more single or multi-core processors collectively represented by a processor 110, a solid-state drive 120, a RAM 130, a dedicated memory 170 and an input/output interface 150. The computing system 100 may be a computer specifically designed for operating in a data center environment. The computing system 100 may be a generic computer system.

In some embodiments, the computing environment 100 may also be a sub-system of one of the above-listed systems. In some other embodiments, the computing environment 100 may be an "off the shelf" generic computer system. In some embodiments, the computing system 100 may also be distributed amongst multiple systems. The computing system 100 may also be specifically dedicated to the implementation of the present technology. As a person in the art of the present technology may appreciate, multiple variations as to how the computing system 100 is implemented may be envisioned without departing from the scope of the present technology.

Communication between the various components of the computing system 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may provide networking capabilities such as wired or wireless access. As an example, the input/output interface 150 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the RAM 130 and executed by the processor 110. For example, the program instructions may be part of a library or an application. Although illustrated as a solid-state drive 120, any type of memory may be used in place of the solid-state drive 120, such as a hard disk, optical disk, and/or removable storage media.

In some embodiments of the present technology, the processor 110 may be a general-purpose processor, such as a central processing unit (CPU) or a processor dedicated to a specific purpose, such as a digital signal processor (DSP). In some embodiments, the processor 110 may also rely on an accelerator 112 dedicated to certain given tasks, such as executing the methods set forth in the paragraphs below. In some embodiments, the processor 110 or the accelerator 112 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

In some embodiments of the present technology, the RAM 130 may comprise high performance memory such as, but not limited to, Quad Data Rate (QDR) SRAM memory. In some embodiments, the RAM 130 may comprise a plurality of QDR SRAM memories. In addition, in some embodiments, dedicated memory 170 may also be relied upon. Such dedicated memory 170 may be a distinct memory unit or integrated to another component. In some embodiments, the dedicated memory 170 is part of an FPGA processing unit (e.g., a register of the FPGA). In some embodiments, the dedicated memory 170 is implemented as a dedicated portion of the RAM 130. Other variations may also be envisioned without departing from the scope of the present technology.

Figure 2B:
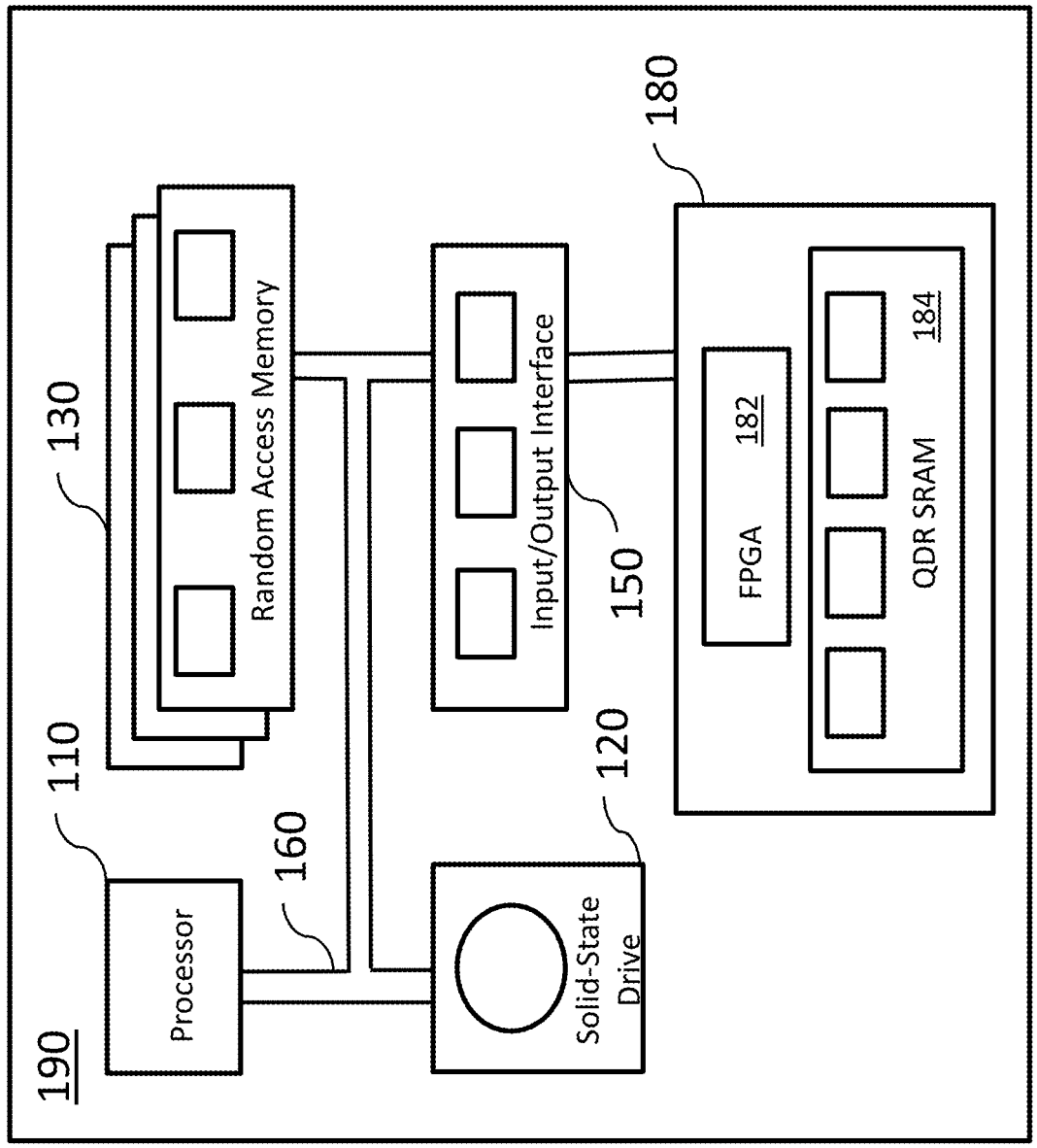

FIG. 2B illustrates a diagram of an alternative computing system 190 in accordance with an embodiment of the present technology. In some embodiments, the computing system 190 may be implemented by similar components as the computing system 100 (similar components being referred to as by same number references). The computing system 190 comprises a dedicated FPGA card 180 which may be connected to other components of the computing environment either by the Input/Output interface 150 or directly through internal and/or external buses 160. In some embodiments, the FPGA card 180 comprises a FPGA chip-set 182 (which may comprise a register, also referred to as a "dedicated memory") and dedicated RAM memory such as the four distinct QDR SRAM memories collectively referred to as QDR SRAM memories 184. In some embodiments, the FPGA card may also comprise one or more input/output interfaces allowing connection to a network.

One aspect of the present technology is to generate a formatted disk-image comprising a partial or complete copy of raw data relating to a content and/or a structure of an entire data storage device of a server. The data storage device may be a hard drive, a solid-state drive (SSD), a logic drive or the like. Data storage device of servers usually comprise sparse data segments and non-sparse data segments, where sparse data segments are segments of data comprised in the data storage device that are empty of any data and contain only zeroes, and non-sparse data segments are segments of data comprised in the data storage device that do not comprise only zeroes.

Figure 3:
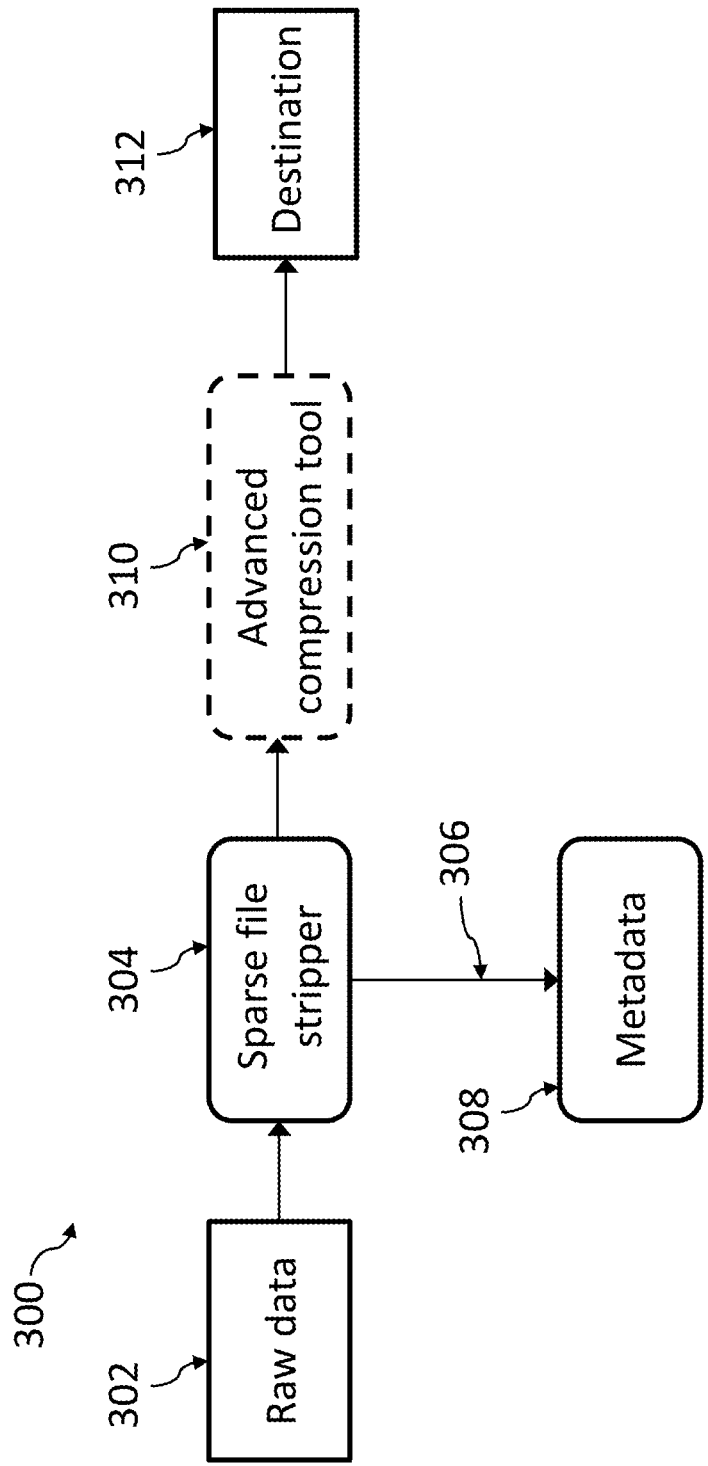
FIG. 3 is a workflow diagram for generating a formatted data stream in accordance with embodiments of the present technology.

Turning now to FIG. 3, a workflow diagram 300 of a method for generating a formatted file in accordance with embodiments of the present technology is illustrated. Raw data 302 being comprised in a data storage device of the first server 10 is to be cloned, the raw data 302 may be stored in a file or may just be a collection of bytes stored in the data storage device of the server, such as a hard drive, an SSD or the like. The networking device 50 is configured to read the raw data 302 and detects sparse data segments and non-sparse data segments of the raw data 302. The networking device 50 is further configured to use a sparse file stripper tool 304 to generate a formatted data stream comprising only the non-sparse data segments of the raw data 302. Therefore, the formatted data stream comprises a concatenation of the non-sparse data segments of the raw data 302. The formatted data stream may be stored in a memory of the first server 10 until the concatenation is complete. Upon detection of a sparse or non-sparse data segment, the networking device 50 populates an offsets file comprised in a metadata file 308 with information 306 relating to the location of sparse data segments of the raw data 302. In one embodiment, the offset file is a list of offsets being appended with a new offset upon detection of a sparse or non-sparse data segment.

In one embodiment, the networking device 50 may use a standard additional compression tool, such as Xzip, Gzip or the like, to compress the generated formatted data stream.

A formatted data stream, that may correspond to a disk-image of the first server 10, is transferred to the destination device 312 that may be a bare-metal server 40. The reconstruction of the raw data 302 based on the formatted data stream will be described with more details hereinafter.

Figure 4:
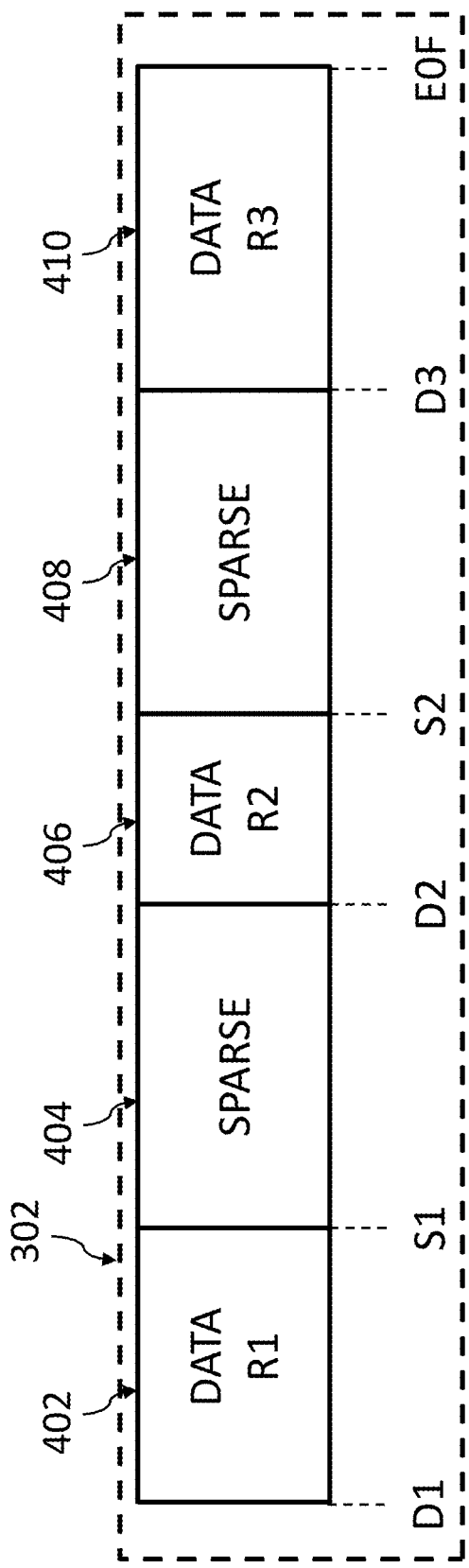
FIG. 4 is a diagram of raw data located in a data storage device of a computing device in accordance with embodiments of the present technology.

FIG. 4 illustrates a diagram of a content of the raw data 302 stored in a data storage device of the server 10 in accordance with an embodiment of the present technology. In the illustrative embodiment, the raw data 302 comprises three non-sparse data segments 402, 406 and 410, separated by two sparse data segments 404 and 408. As an example, the concatenation of the non-sparse data segment 406 with the sparse data segment 408 and the non-sparse data segment 410 may be considered as a non-sparse data segment. The computer-implemented system of the server 10 is configured to read the raw data 302, locate the sparse data segments in the raw data 302 and generate a list of absolute offsets D1, S1, D2, S2, D3 and E0F, where each offset corresponds to the beginning of a new data segment or the end of the last data segment of the raw data 302.

In the illustrative embodiment of FIG. 4, the size of the non-sparse data segment 402 is S1-D1, the size of the sparse data segment 404 is D2-S1, the size of the non-sparse data segment 406 is S2-D2, the size of the sparse data segment 408 is D3-S2, the size of the non-sparse data segment 410 is E0F-D3.

Although three non-sparse data segments 402, 406 and 410, and two sparse data segment 404 and 408 are represented on FIG. 4, the raw data 302 may comprise a different number of sparse data segments and non-sparse data segments. This aspect is not limitative.

Figure 5A:
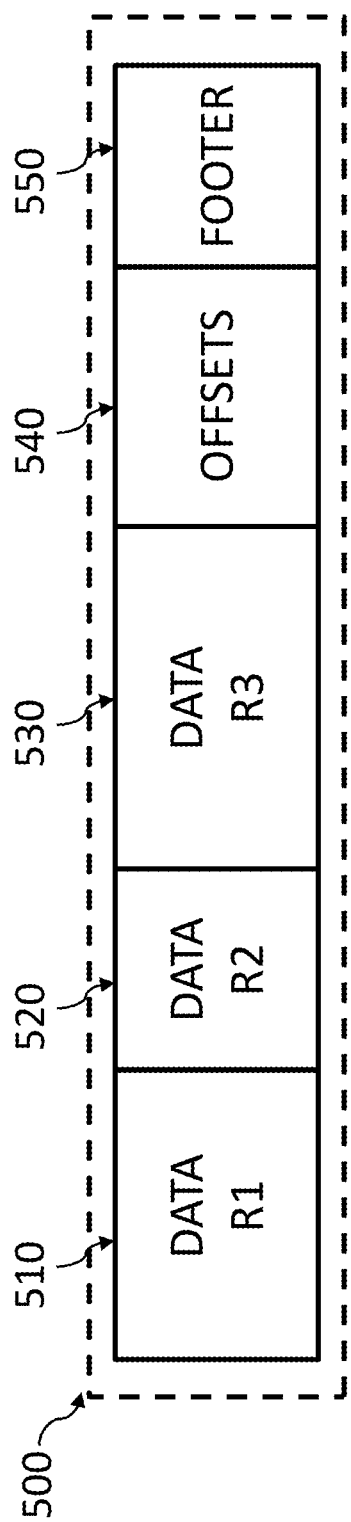
FIGS. 5A, 5B and 5C are diagrams of a formatted data stream in accordance with embodiments of the present technology.

Turning now to FIG. 5A, a formatted data stream 500 is illustrated. The computer-implemented system of the server 10 generates a concatenation of the non-sparse data segments 510, 520 and 530, relating respectively to non-sparse data segments 402, 406 and 410 of the raw data 302. In the illustrative embodiment, the offsets file 540 of the metadata file 308 is concatenated to the non-sparse data segments. In another embodiment, the metadata file 540, and so the offsets file 540, may be separated from the formatted data stream.

In the illustrative embodiment, the formatted data stream 500 may comprise a footer 550. A content of the footer 550 will be described in connection with the description of a later Figure.

Figure 5B:
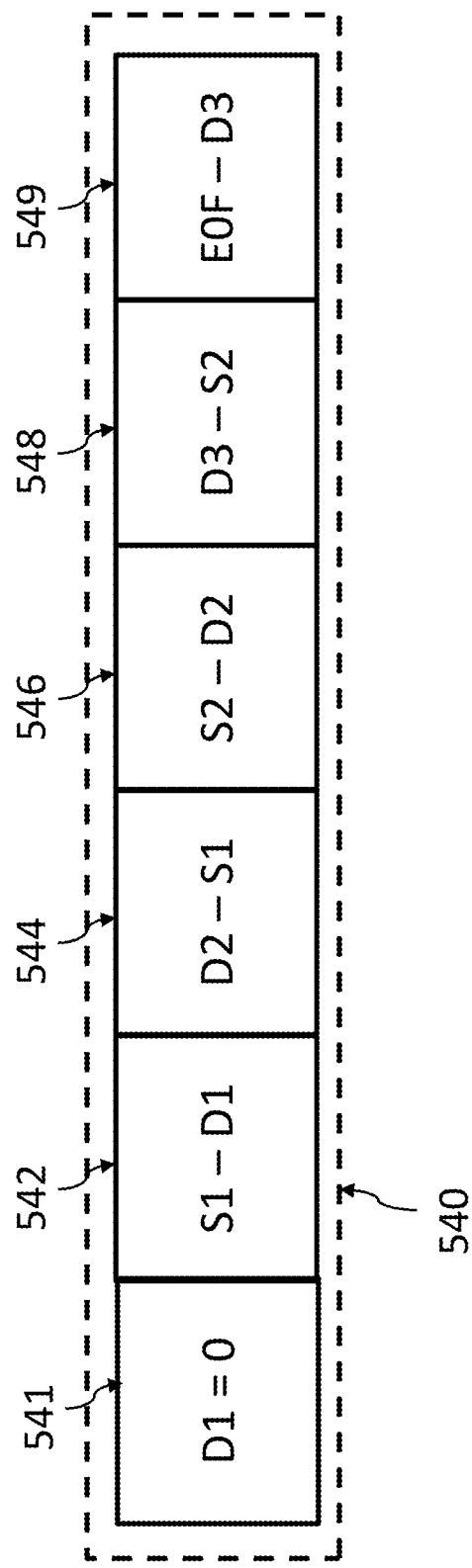

FIG. 5B illustrates the content of the offsets file 540. In the illustrative embodiment of FIG. 5B, the offsets file 540 comprises relative offsets of the sparse data segments and non-sparse data segments. In one embodiment, the value 541 relates to the offset of the beginning of the first non-sparse data segment, the value 542 is the relative offset of the non-sparse data segment 510 relating to the non-sparse data segment 402, the value 544 is the relative offset of the sparse data segment 404, the value 546 is the relative offset of the non-sparse data segment 520 relating to the non-sparse data segment 406, the value 548 is the relative offset of the sparse data segment 408, and the value 549 is the relative offset of the non-sparse data segment 530 relating to the non-sparse data segment 410. The offsets file 540 has a different size depending on a number of non-sparse data segments and sparse data segments in the raw data 302.

In another embodiment, the value 541 may relate to the offset of the beginning of the first sparse data segment. This aspect is not limitative.

In another embodiment, the offsets file contains the absolute offsets of each of the sparse data segments and non-sparse data segments.

Figure 5C:
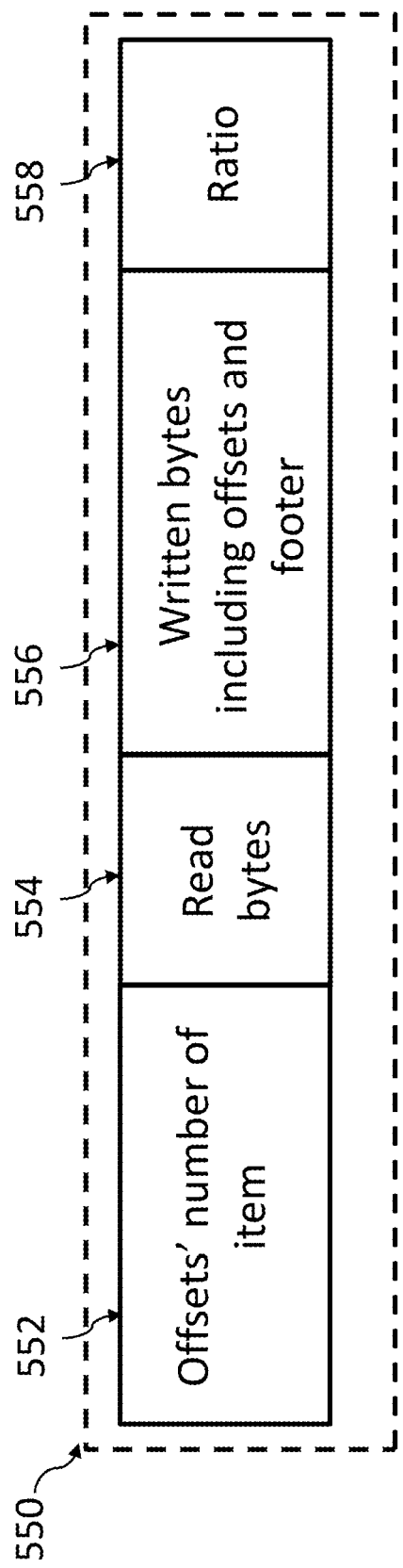

FIG. 5C illustrates a content of the footer 550 of the formatted data stream 500. In one embodiment, the footer 550 comprises a value 552 relating to the number of items in the offsets file 540, a value 554 relating to a number of bytes of the raw data 302 that have been read to generate the formatted file 500, a value 556 relating to a number of bytes written to generate the formatted file 500, and a value 558 relating to a compression ratio of the value 554 over the value 556. In the same or another embodiment, the footer may include a different number of values relating to other features of the formatted file 500. This aspect is not limitative.

In another embodiment, the offsets file 540 is not concatenated to the non-sparse data segments of the formatted data stream 500 and is send separately along with the formatted data stream 500.

Figure 6:
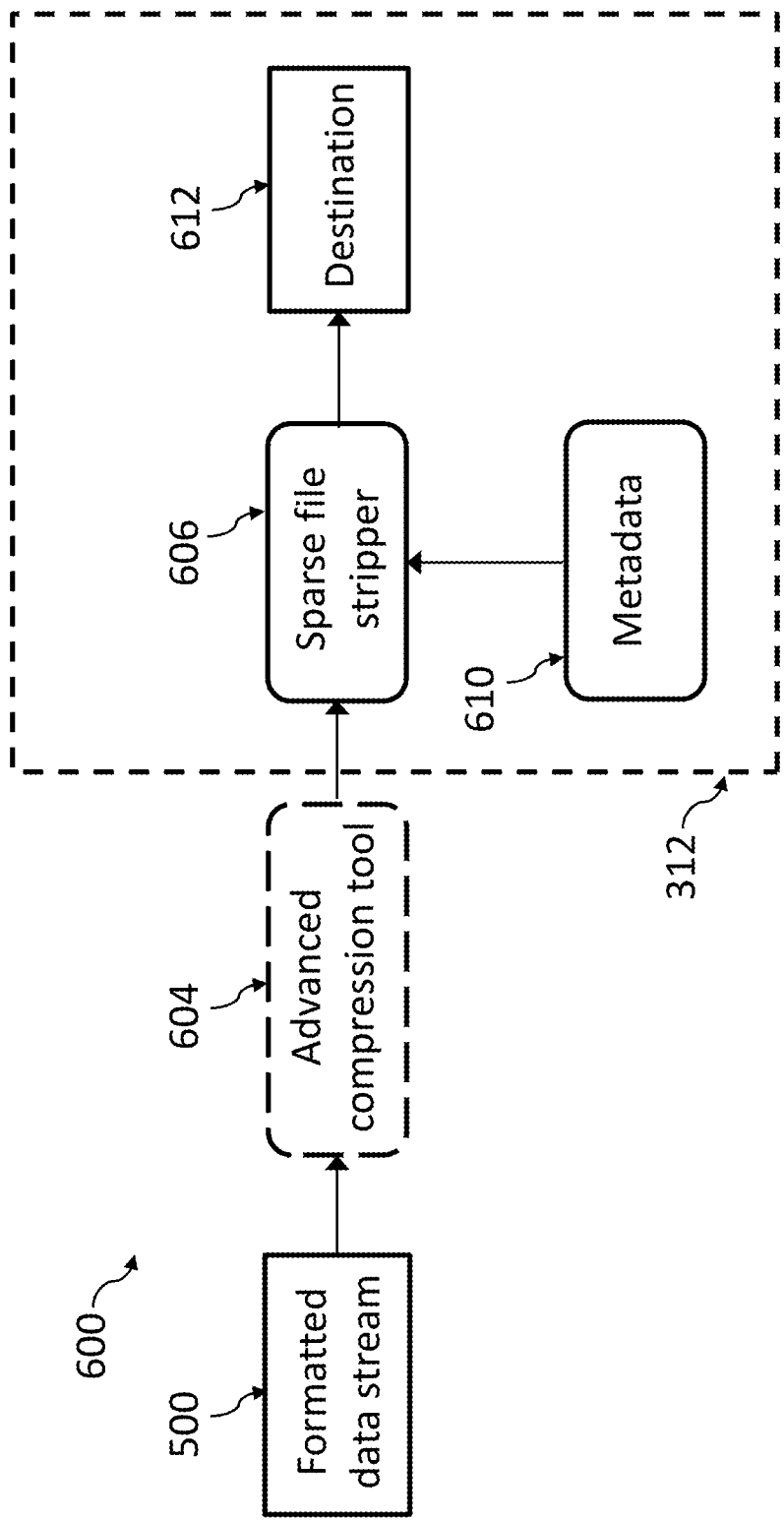
FIG. 6 is a workflow diagram for reconstruction of raw data in accordance with embodiments of the present technology.

FIG. 6 illustrates a reconstruction workflow diagram 600 of the raw data 302 based on the formatted data stream 500 in accordance with one embodiment of the present technology. The formatted data stream 500 is received by a destination device 312 that may be one of the one or more servers 40 and stored in a memory of the destination device 312. The memory may be a RAM, a buffer memory or the like. A preliminary standard decompression tool 604 may be executed on the formatted data stream 500, the standard decompression tool being associated with the standard additional compression tool used by the server 10. The networking device 50 is configured to extract the offsets file 540 from the formatted data stream 500 as the formatted data stream 500 is received. This operation allows the destination device 312 to stream the non-sparse data segments comprised in the formatted data stream 500 and reconstruct in the raw data 302 on a destination 612 of the destination device 312. The destination 612 may be a data storage device such as a hard drive, an SSD or the like of the destination device 312.

In one embodiment, the offsets file 540 is independently sent from the server 10 and received by one of the one or more servers 40 as a metadata file 610.

The networking device 50 is configured to, based on the offsets file 540, to determine when a sparse data segment is to be reconstructed and when a non-sparse data is to be reconstructed on the destination 612. If a non-sparse data segment is to be reconstructed, the non-sparse data segment is streamed, and a corresponding data content of the non-sparse data segment is written on the destination 612. If a sparse data segment is to be reconstructed, the networking device 50 emits a command to define a segment of zero which size corresponds to the size of the sparse data segment, the size of the sparse data segment being based on the content of the metadata file 610. This command depends on the type of memory, disk, SSD, etc, or, in a larger context, of the type of destination device 612 that receives the formatted data stream.

In one embodiment, the networking device 50 is configured to leverage the capabilities of the destination device 312 to instantly generate a segment of zeros upon receipt of a command from the networking device 50 and spare writes of zeros of the sparse data segments. As an example, the networking device 50 emits either a "hole punching" command if the destination device 612 is a filesystem that supports this command, an "instant zeroing" command if the destination device 612 is a drive that supports this command to zero out the drive or a command to return zero for discarded sectors of block devices (e.g RZAT support for Solid-States Drives).

In the case where the destination device 612 does not support any commands described above, the destination device is further configured to automatically write a segment of zeros, each zero of the segment being individually generated, whose size is equal to the size of the sparse data segment to be reconstructed in replacement of or as part of the execution of the command.

Figure 7:
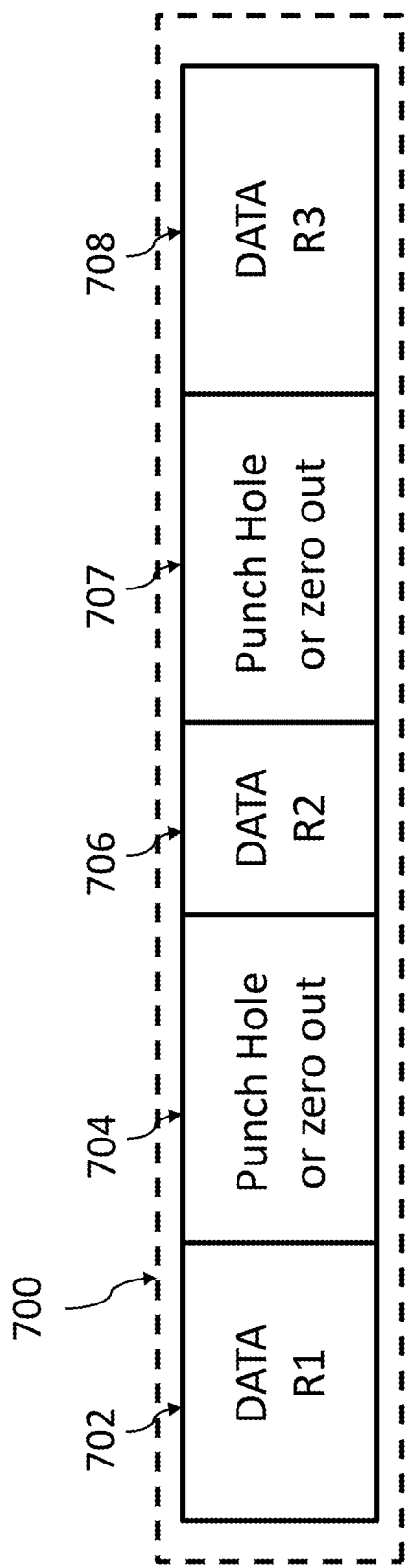
FIG. 7 is a diagram of raw data after reconstruction in accordance with embodiments of the present technology.

FIG. 7 is a diagram of raw data 700 after reconstruction in accordance with embodiments of the present technology. The computer-implemented system of the destination device 612 is configured to browse the metadata file 610 to access the offsets of the non-sparse data segments and sparse data segments comprised in the formatted data stream 500, browsing the metadata file 610 comprising reading and accessing items comprised in the metadata file 610. This first operation allows the computer-implemented system to determine if a first data segment is a sparse data segment or a sparse data segment based on the first value 541 of the offsets file 540 comprised in the metadata file 610. As an example, if the first value 541 is set to be the offsets of the first non-sparse data segment and the value 541 is not equal to zero, the first data segment to be reconstructed is a sparse data segment and the computer-implemented system starts by generating a segment of zeros whose size is equal to the value 541. If the first value 541 is set to be the offsets of the first non-sparse data segment and the value 541 is equal to zero, the first data segment to be reconstructed is a non-sparse data segment and the computer-implemented system starts by streaming the sparse data segment of the formatted data stream until the size of the reconstructed data is equal to the value 541.

In the illustrative embodiment of FIG. 7, the raw data 700 is sequentially reconstructed on the destination device 612, based on the offsets of the metadata file 610, by writing on the destination 612 a first non-sparse data segment 702 corresponding to the streaming of the non-sparse data segment 510 of the formatted data stream 500. The offsets file gives the size of the non-sparse data segment 702 to be written. Once the non-sparse data segment 702 has been written, a segment of zeros 704 is instantly generated by a command from the networking device 50, the size of the segment of zeros 704 being equal to the size of the sparse data segment 404 of the raw data 302. The non-sparse segment 520 is then streamed from the formatted data stream 500 and relating data content is written as a non-sparse data segment 706. The segment of zeros 707 and the non-sparse data segment 708 are sequentially written in the same manner than segment of zeros 704 and non-sparse data segments 702 and 706 respectively.

Figure 8A:
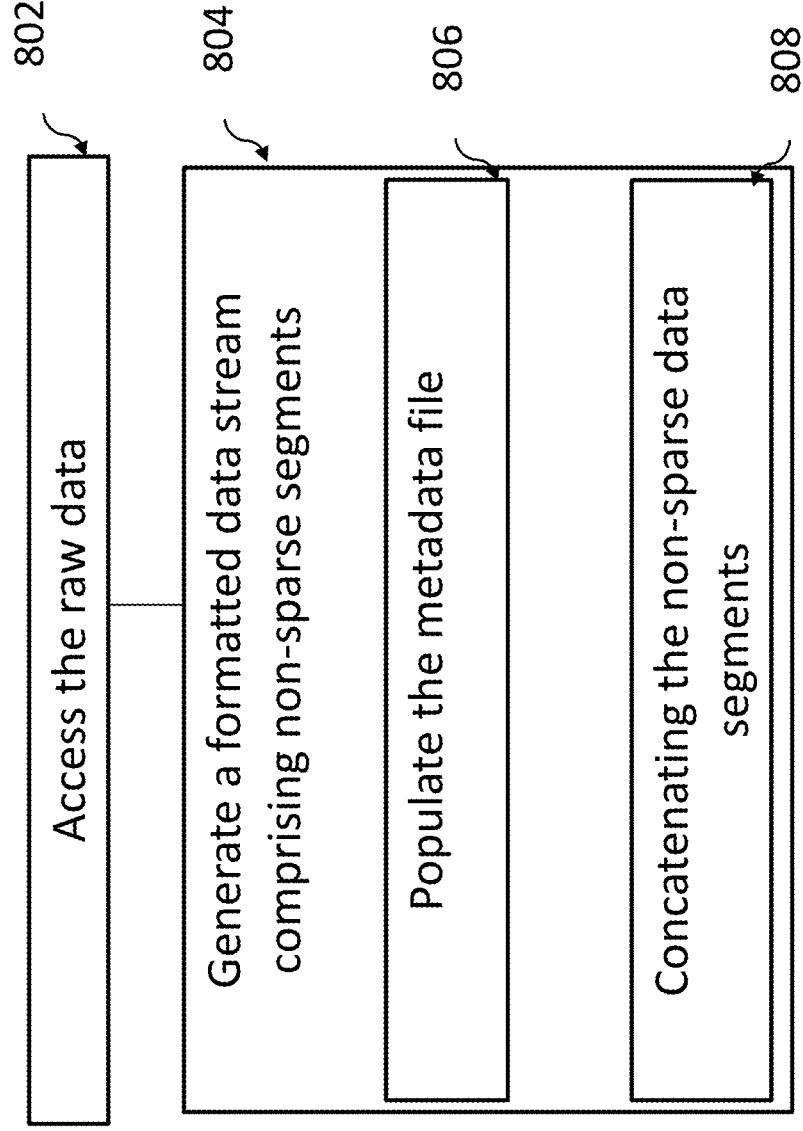
FIGS. 8A and 8B are sequence diagrams showing operations of a method for formatting and reconstruction of raw data in accordance with embodiments of the present technology.

FIG. 8A illustrates a sequence diagram showing operations of a method for formatting raw data. The raw data are accessed and read at operation 802, the raw data comprising sparse data segments and non-sparse data segments, the sparse data segments being empty of any data, the non-sparse data segments comprising data. A formatted data stream is generated at operation 804. The formatted data stream comprises a concatenation of non-sparse data segments whose content relates to the non-sparse data segments of the raw data. A metadata file is populated at sub-operation 806, the metadata file comprising offsets relating to the location of non-sparse data segments and sparse data segments of the raw data. Upon detection of non-sparse data segment of the raw data, a non-sparse data segment is generated and concatenated to the formatted data stream at sub-operation 808, a content of the non-sparse data segment of the formatted data stream being related to the non-sparse data segment of the raw data. In one embodiment, the non-sparse data segment of the formatted data stream may be a copy of the non-sparse data segment of the raw data.

In one embodiment, the generation of the formatted data stream at operation 804 is stopped when all the non-sparse data segments of the raw data have been copied. The metadata file may be concatenated to the formatted data stream when sub-operation 806 and 808 stop. The formatted data stream may be stored or transmit to another device for reconstruction of the raw data.

In one embodiment, the metadata file contains a value relating to the number of offsets comprised in the metadata file. In the same or another embodiment, the formatted data stream is further compressed with a known compression tool.

As an example, the method illustrated on FIG. 8A may be applied to generate a formatted disk-image of a server, the raw data being related to a content and/or a structure of an entire data storage device of the server.

Figure 8B:
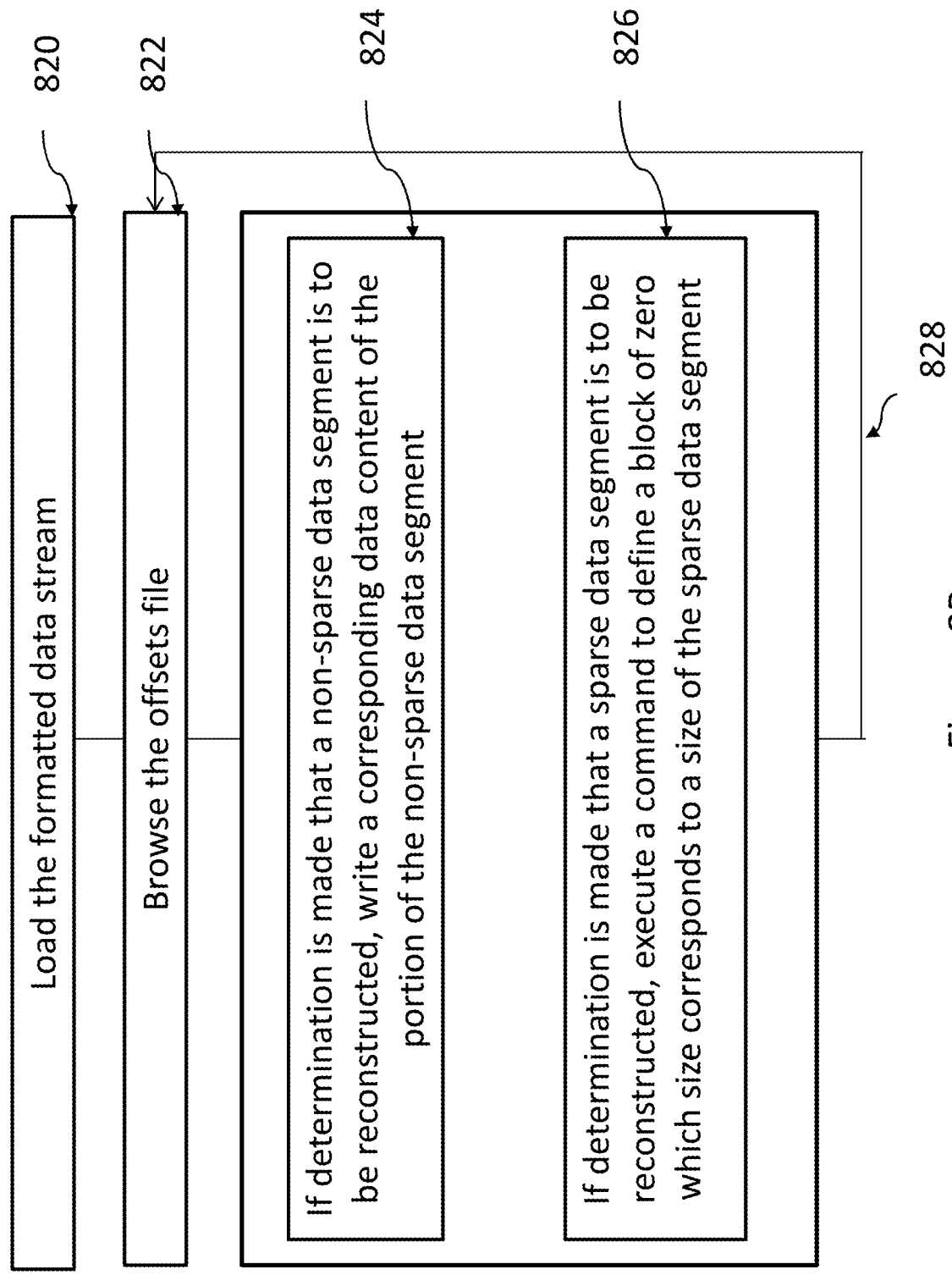

FIG. 8B illustrates a sequence diagram showing operations of a method for reconstructing the raw data from the formatted data stream in accordance with one embodiment of the present technology. The formatted data stream is loaded at operation 820 in a memory of a destination device receiving the formatted data stream, the loading may be a downloading of the formatted data stream from the network 30. The metadata file relating is browsed at operation 822 to access the offsets relating to the data segments of the raw data. If determination is made, based on the offsets of the metadata file, that a non-sparse segment is to be reconstructed, the non-sparse data segment is written in the destination device at operation 824. The writing operation may be made on a data storage device such as a hard drive, an SSD or the like of the destination device. If determination is made, based on the offsets of the metadata file, that a sparse data segment is to be reconstructed, a command is executed to define a block of zero which size corresponds to a size of the sparse data segment at operation 826. The loop operation 828 initiates the browsing of the offsets file and the reconstruction of a new data segment of the raw data until the raw data has been entirely reconstructed.

As an example, the method illustrated in the combination of FIG. 8A and FIG. 8B may be used to deploy OS in bare-metal servers of cloud systems providers. Indeed, the method may be used to generate a formatted disk-image of a first server, the disk-image being a copy raw data relating to a content and/or a structure of an entire data storage device of a server, and reconstruct relating data on a second server. In this scenario, the formatted disk-image comprises the data relating to the OS of the first server. Reconstruction of the raw data on a second server being responsible for the deployment of the OS on the second server. The formatted disk-image is loaded and stored in a memory such as a RAM, a buffer or the like of the second device before the writing of non-sparse data segment and definition of the sparse data segments.

The method described previously is suitable to stream the formatted data stream 500 while the networking device 50 is configured to extract the metadata file 610 containing the offset file 540 and a memory such as a RAM, a buffer memory or the like of the destination device 612 has a storage capacity high enough to store the entire formatted data stream 500.

One aspect of the present technology is to provide a method to format, stream and reconstruct raw data without limitation on the size of the raw data.

Figure 9:
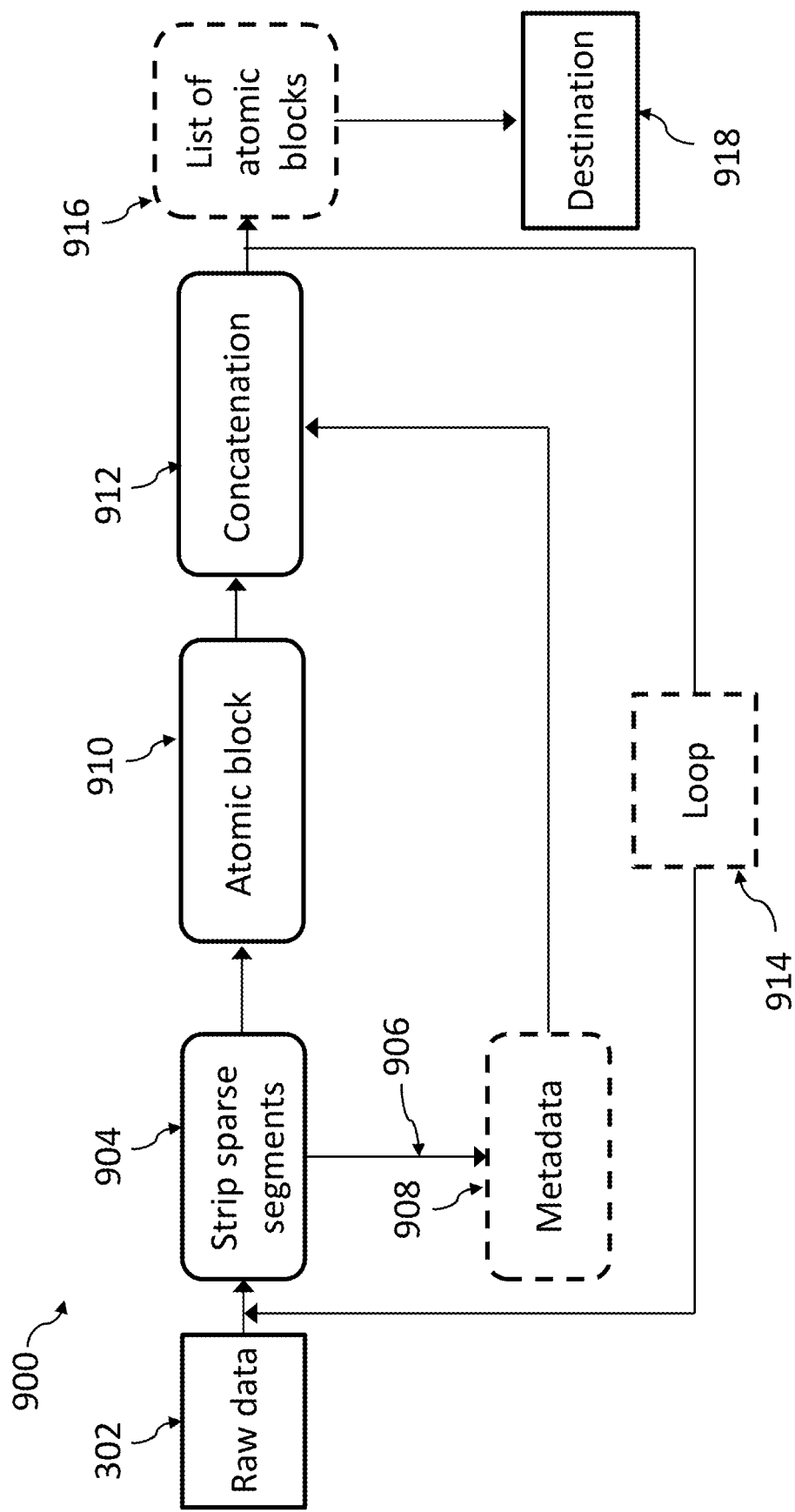
FIG. 9 is a workflow diagram for generating a formatted data stream in accordance with alternative embodiments of the present technology.

FIG. 9 illustrates a workflow diagram 900 for generating a formatted data stream composed of atomic blocks in accordance with embodiments of the present technology. In this illustrative embodiment, the method is particularly adapted to perform the formatting, streaming and reconstructing of raw data 302 whose size is higher than a storage capacity of a memory such as a RAM, a buffer memory or the like of a destination device 918. The raw data 302 may be contained in the server 10. The computer-implemented system of the first server 10 is configured to store a maximum atomic block size as a parameter for the formatting of the raw data 302, the maximum atomic block size relating to the size of the memory of the destination device 918.

The networking device 50 is configured to format the raw data 302, formatting the raw data 302 comprising reading the raw data 302, detecting sparse data segments and non-sparse data segments of the raw data 302, and further using a sparse file stripper tool 804 to generate an atomic block 910 comprising a concatenation of the non-sparse data segments of the raw data 302. A metadata file 908 is populated with the offsets of the non-sparse data segments and sparse data segments of the raw data 302 read during the process of formatting the atomic block.

The networking device 50 is configured to start formatting a new atomic block when a size of the concatenation of the non-sparse data segment of the atomic block 810 reaches a maximum data size or when a size of the metadata file 908 reaches a maximum metadata size, depending on which occurs first. Therefore, a maximum atomic block size is defined corresponding to the addition of the maximum data size with the maximum metadata size. The maximum atomic block size is further configured to match the storage capacity of the memory of the destination device 918. In one embodiment, the size of the concatenation of non-sparse data segment may be lower than the maximum data size. In the same or another embodiment, the size of the metadata file 908 may be lower than the maximum metadata size. Therefore, two atomic blocks may have a different size and a different repartition between their respective non-sparse data segments and metadata file.

The computer-implemented system is further configured to concatenate the metadata file 908 to the atomic block 910 at concatenation operation 912 and the atomic block may be transmitted to the destination device 918 to be streamed.

Once an atomic block is generated, the computer-implemented system of the first server 10 is configured to start reading the raw data 302 where the formatting of the raw data 302 stopped after generation of the atomic block. The loop 914 is configured to initiate the generation of new atomic blocks until the entire raw data 302 has been formatted. Therefore, the list of atomic blocks 916 comprises a representation of the raw data 302, each of the atomic blocks comprising a representation of a portion of the raw data 302.

In one embodiment, the transmission of a first atomic block and the generation of a second atomic block are executed in parallel.

In one embodiment, the computer-implemented system of the server 10 may use a standard additional compression tool, such as Xzip, Gzip or the like, to compress the generated atomic block.

Figure 10:
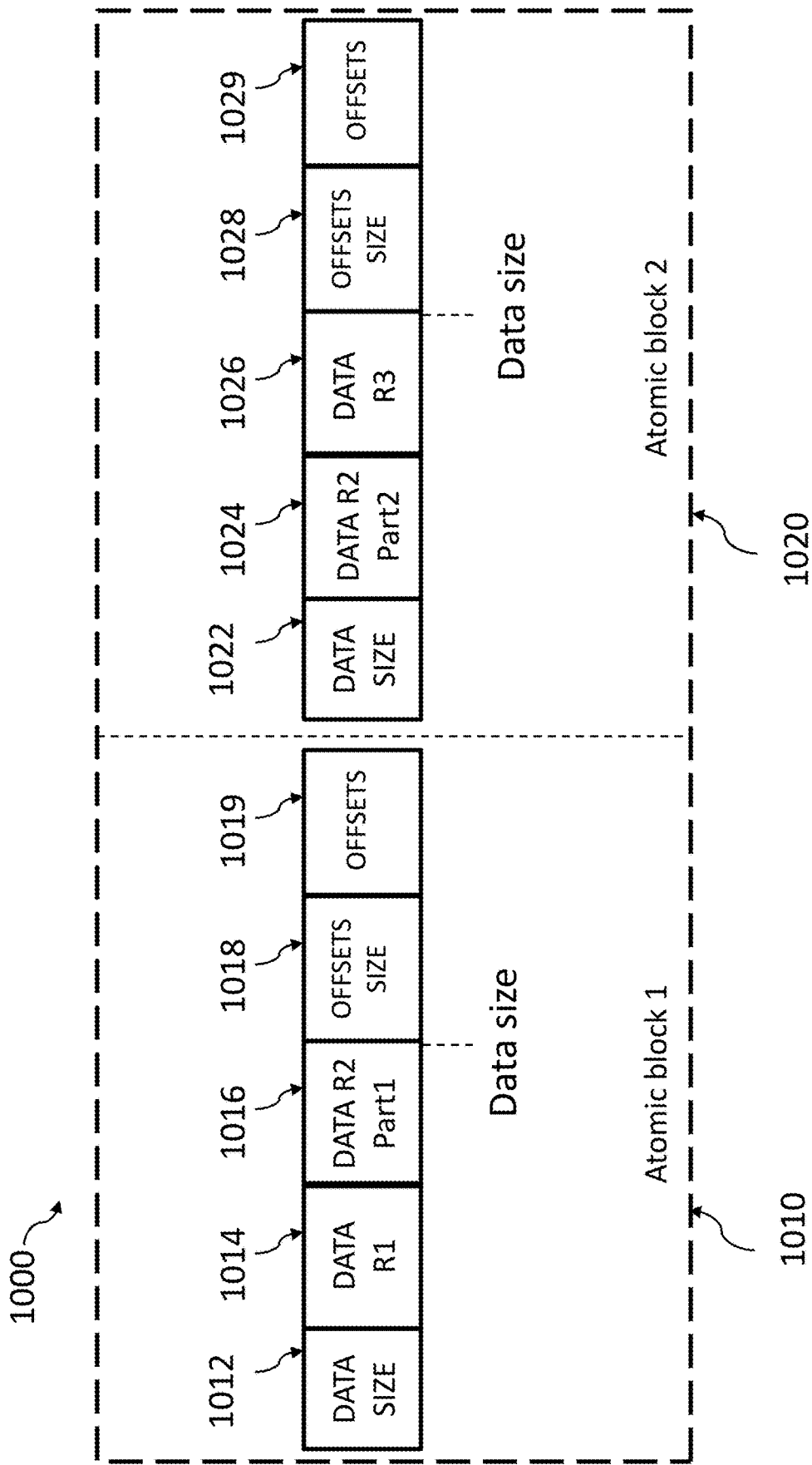
FIG. 10 is a diagram of a formatted data stream in accordance with alternative embodiments of the present technology.

FIG. 10 illustrates a diagram of a formatted data stream 1000 in accordance with embodiments of the present technology. In this illustrative embodiment, the formatted data stream is composed of a first atomic block 1010 and a second atomic block 1020. The first atomic block 1010 comprises a concatenation of the non-sparse data segments 1014 and 1016, relating respectively to non-sparse data segments 402 and a portion of the non-sparse data segment 406 of the raw data 302. A value 1012 relating to the data size of the non-sparse data segment 1014 and 1016 is added to the first atomic block 1010. An offsets file 1019 comprising the offsets of the metadata file 908 associated with the first atomic block 1010 is concatenated to the first atomic block 1010, along with a value 1018 relating to a size of the offsets file 1019. In one embodiment, the metadata file 908 associated with the first atomic block 1010, and so the offsets file 1019 and the value 1018, may be transmitted to the destination device 918 separately from the first atomic block 1010.

The second atomic block 1012 comprises a concatenation of the non-sparse data segments 1024 and 1026, relating respectively to a portion of the non-sparse data segments 406 and the non-sparse data segment 408 of the raw data 302. A value 1022 relating to the data size of the non-sparse data segment 1024 and 1026 is added to the second atomic block 1020. An offsets file 1029 comprising the offsets of the metadata file 908 associated with the second atomic block 1020 is concatenated to the second atomic block 1020, along with a value 1028 relating to a size of the offsets file 1029. In one embodiment, the metadata file 908 associated with the second atomic block 1020, and so the offsets file 1029 and the value 1028, may be transmitted to the destination device 918 separately from the second atomic block 1020.

In the illustrative embodiment, the combination of the non-sparse data segments 1016 and 1024 is a representation of the non-sparse data segment 406 of the raw data 302. In the same or another embodiment, the first atomic block 1010 is transmitted to the destination device 818 to be streamed while the second atomic block 1020 is being formatted. In one embodiment, the offsets file 1029 and the value 1028 may be transmitted separately from the first atomic block 1020.

In one embodiment, a footer of the list of atomic block 916 is generated, the footer may comprise a value relating to a number of the atomic blocks comprised in the list of atomic block 916, a number of read bytes of the raw data 302 to generate the formatted data stream 1000, a number of written bytes including written bytes of the offsets array file and the footer in the reconstruction of the raw data 302, and/or a ratio between the number of read bytes and the number of written bytes. The footer may be concatenated to the formatted data stream 1000.

Although two atomic blocks are represented on FIG. 9, the formatted data stream 1000 may comprise a different number of atomic blocks. This aspect is not limitative.

Figure 11:
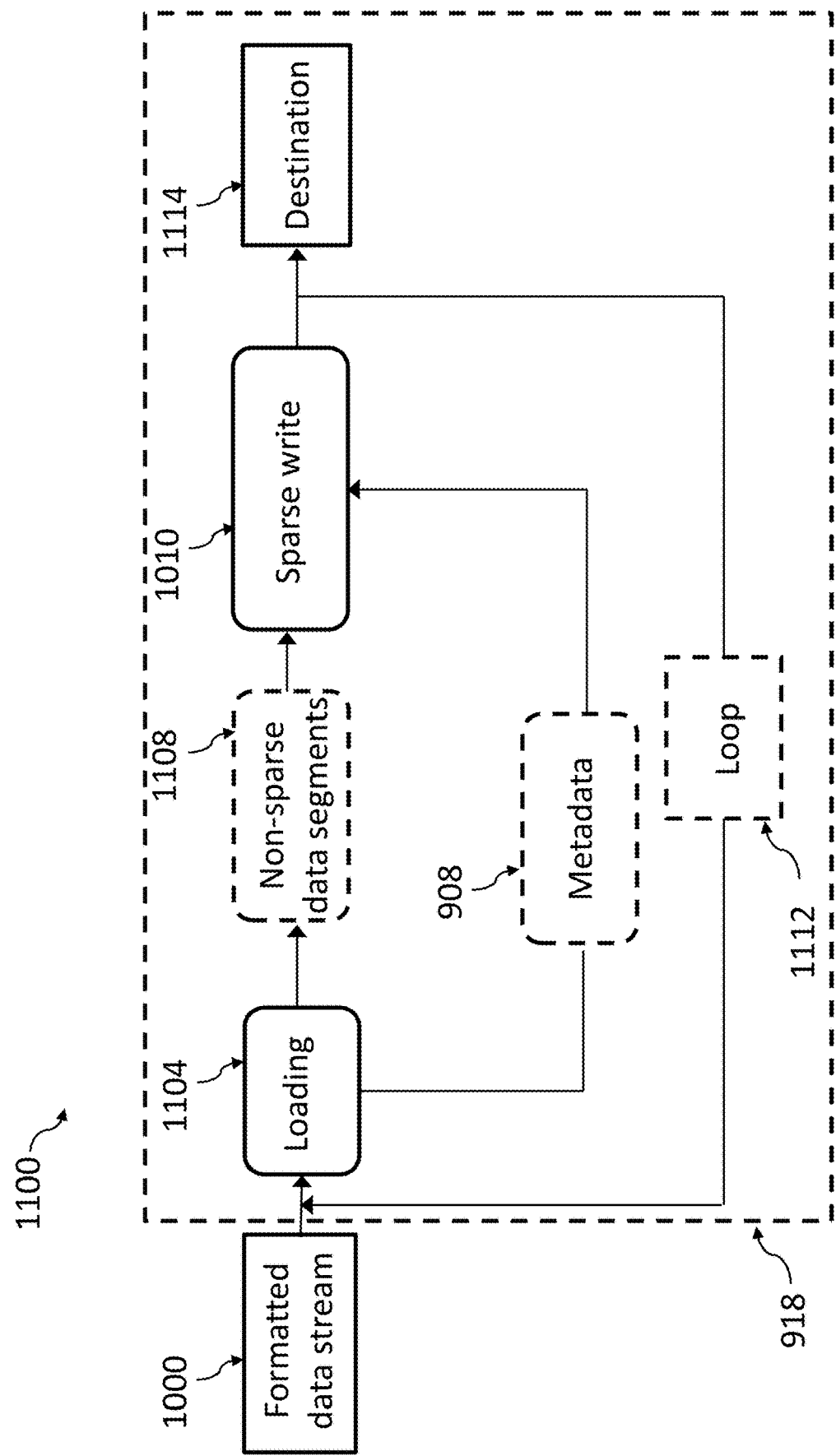
FIG. 11 is a workflow diagram for reconstruction of raw data in accordance with embodiments of the present technology.

FIG. 11 illustrates a workflow diagram for reconstruction of the raw data 302 in accordance with embodiments of the present technology. Each of the atomic blocks of the formatted data stream 1000 is received by a destination device 918 that may be one of the one or more servers 40 and stored in a memory such as a RAM, a buffer memory or the like, the size of each atomic block being set lower than the size of the memory. The computer-implemented system is configured to reconstruct each of atomic block of the formatted data stream 1000 successively. A first atomic block is received and loaded at loading operation 1104. A preliminary standard decompression tool may be executed on the first atomic block, the standard decompression tool being associated with the standard additional compression tool used by the server 10.

The metadata file 908 comprised in the first atomic block is browsed by the computer-implemented system. This operation allows the destination device 918 to stream the non-sparse data segments comprised in the first atomic block and reconstruct a portion the raw data 302 on a destination 1114. The destination 1114 may be a data storage device such as hard drive, an SSD or the like of the destination device 918. Non-sparse data segment of the first atomic block of the formatted data stream 1000 are stream and relating data are written on the destination 1114. Similar to the illustrative embodiment of FIG. 6, the networking device 50 is configured to leverage the capabilities of the destination device 918 to instantly generate a segment of zeros upon receipt of a command from the networking device 50 and spare writes of zeros of the sparse data segments.

Once the portion of the raw data 302, the portion corresponding to the data segments of the first atomic block, is reconstructed, the loop 1112 initiates the loading operation 1104 of another atomic block of the formatted data stream 1000 to reconstruct the relating portion of the raw data 302 until all the atomic block of the formatted data stream have been streamed and the raw data 302 have been completely reconstructed on the hard drive 1114.

Figure 12A:
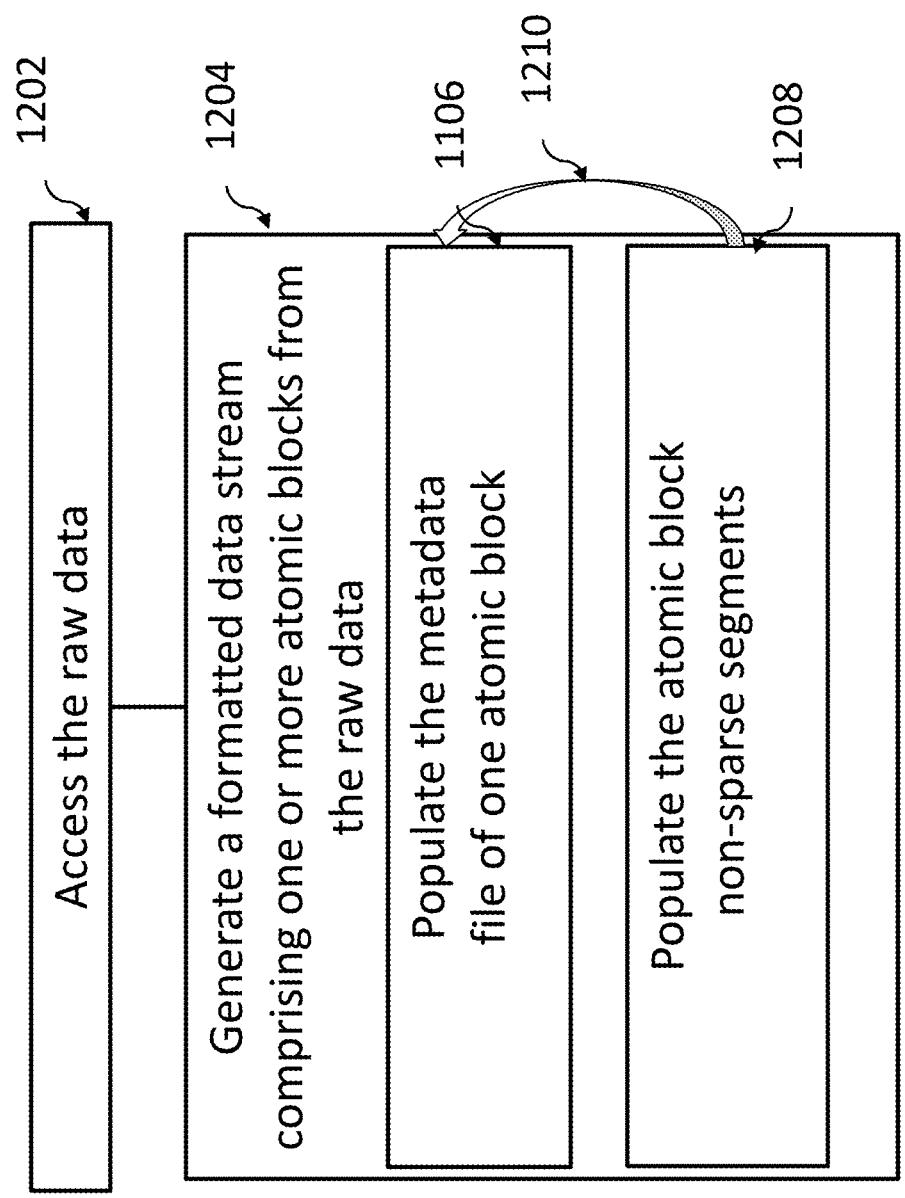
FIGS. 12A and 12B are sequence diagrams showing operations of a method for formatting and reconstruction of raw data in accordance with embodiments of the present technology.

FIG. 12A illustrates a sequence diagram showing operations of a method for formatting raw data. The raw data are accessed and read at operation 1202, the raw data comprising sparse data segments and non-sparse data segments, the sparse data segments being empty of any data, the non-sparse data segments comprising data. A formatted data stream is generated at operation 1204. The formatted data stream comprises one or more atomic blocks, each atomic block comprising non-sparse data segments relating to a portion of the raw data. A metadata file is populated at sub-operation 1206, the metadata file comprising offsets relating to the location of non-sparse data segments and sparse data segments of the raw data. At sub-operation 1208, an atomic block is populated with a concatenation of non-sparse data segments relating to non-sparse data segments of the raw data. As an example, non-sparse data segment of one atomic block may be a copy of the non-sparse data segments or a copy of a portion of the non-sparse data segments of the raw data.

In one embodiment, the population of the metadata file at sub-operation 1206 and the population of one atomic block at sub-operation 1208 is stopped when the size of the metadata file reaches a first limit or when the size of the concatenation of the non-sparse data segment of the atomic block reaches a second limit. The metadata file may be concatenated to the atomic block when sub-operation 1206 and 1208 stop. A loop operation 1210 initiates the population of a new metadata file and a new atomic block when the size of the atomic block being populated reaches a maximum limit. New atomic blocks and new metadata files are populated until the raw data is entirely formatted. The atomic block may be stored or transmit to another device for reconstruction of the raw data.

In one embodiment, the metadata file contains a value relating to the number of offsets comprised in the metadata file. In the same or another embodiment, the atomic block comprises a value relating to the size of the non-sparse data segments populated in the atomic block. In the same or another embodiment, each atomic block is further compressed with a known compression tool.

As an example, the method illustrated on FIG. 12A may be applied to generate a formatted disk-image of a server, the raw data being related to a content and/or a structure of an entire data storage device of the server.

Figure 12B:
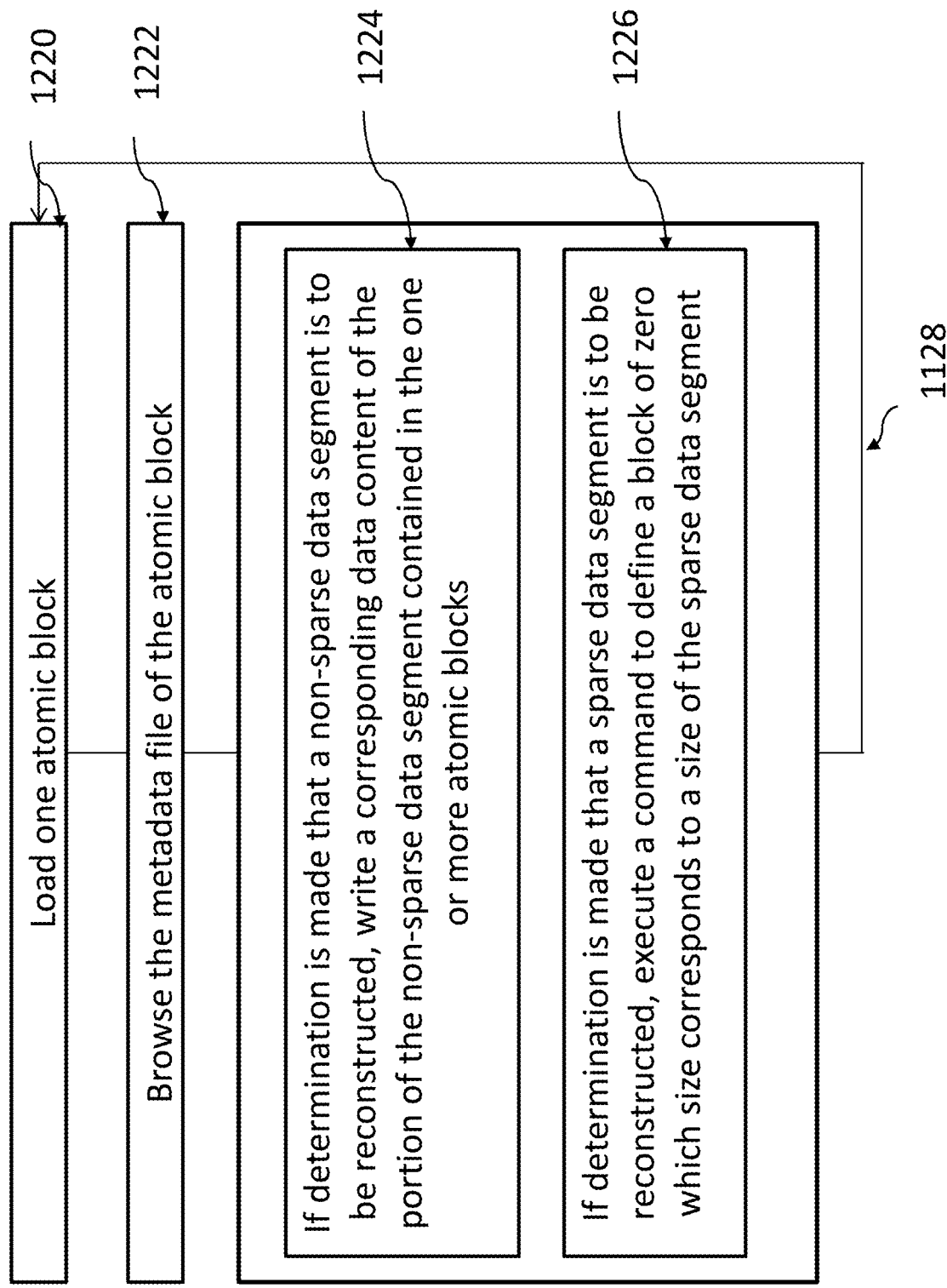

FIG. 12B illustrates a sequence diagram showing operations of a method for reconstructing the raw data from the formatted data stream. One atomic block of the formatted data stream is loaded at operation 1220 in a memory of a destination device receiving the formatted data stream, the raw data being reconstructed on a data storage device such as a hard disk, an SSD or the like of the destination device. The metadata file relating to the atomic block is browsed to access the offsets relating to the data segments of the raw data. If determination is made, based on the offsets of the metadata file, that a non-sparse segment is to be reconstructed, the non-sparse data segment is written in the destination device at operation 1224. If determination is made, based on the offsets of the metadata file, that a sparse data segment is to be reconstructed, a command is executed to define a block of zero which size corresponds to a size of the sparse data segment at operation 1226. Once the portion of raw data relating to the atomic block has been reconstructed, the loading of a new atomic block of the data stream is initiate at loop operation 1228. New atomic blocks are process in the same manner until the raw data is completely reconstructed.

As an example, the method illustrated in the combination of FIG. 12A and FIG. 12B may be used to deploy Operating systems (OS) in bare-metal servers of cloud systems providers. Indeed, the method may be used to generate a formatted streamable disk-image of a first server, the disk-image being a copy raw data relating to a content and/or a structure of an entire data storage device of a server, and reconstruct relating data on a second server. In this scenario, the formatted streamable disk-image comprises the data relating to the OS of the first server. Reconstruction of the raw data on a second server being responsible for the deployment of the OS on the second server. The method allows the second server to stream a disk-image whose size is higher than the memory of the second server. Consequently, the method facilitates the deployment of OS via the transmission of formatted streamable disk-image that may be streamed without having to be entirely stored to be processed, as the size of each atomic block may be set lower than the memory of the server receiving the streamable disk-image.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 13:
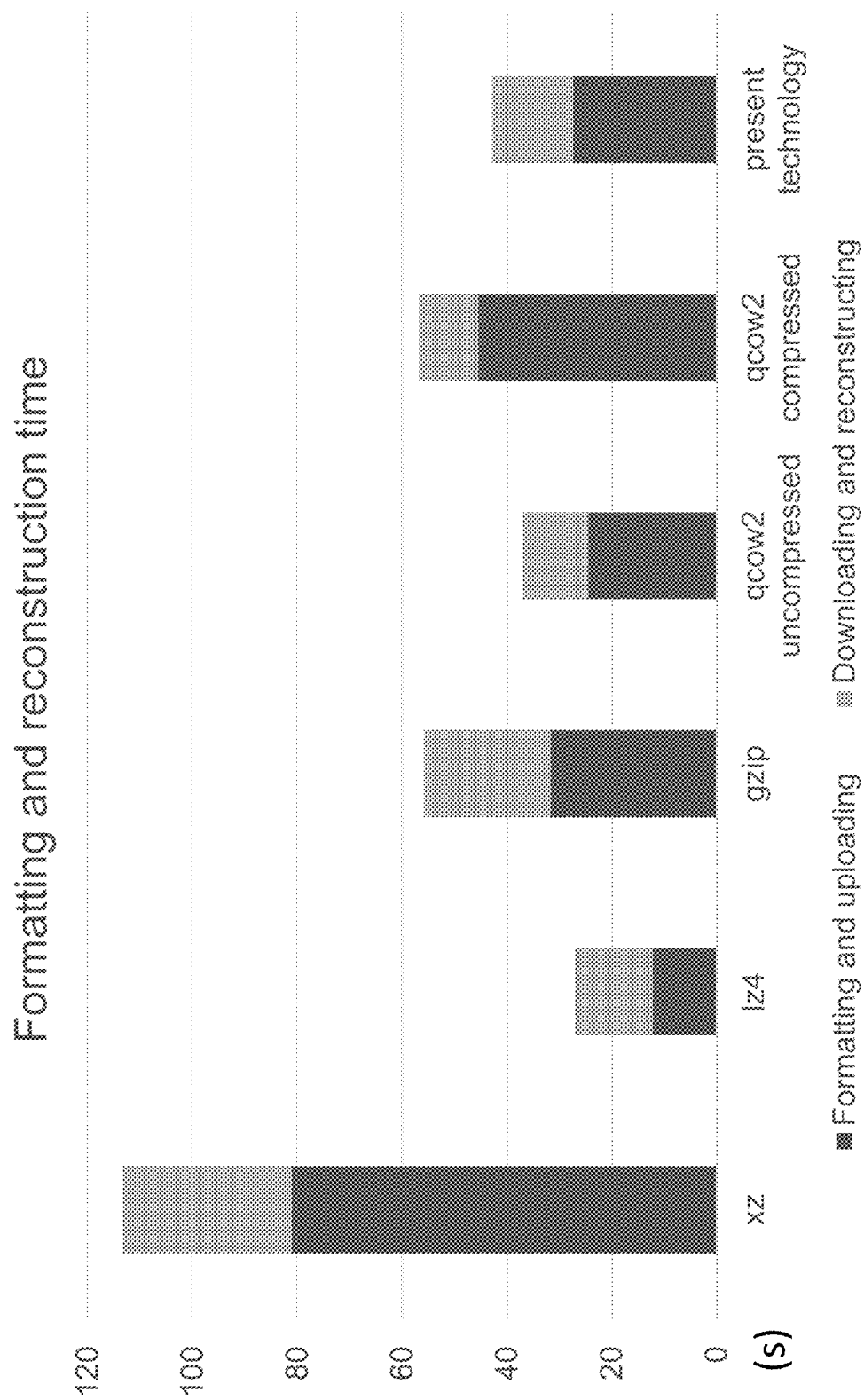
FIG. 13 is a bar chart comparing the formatting time and reconstructing of raw data by different known technologies versus the present technology.

FIG. 13 illustrates a bar chart comparing the formatting time of raw data added to the upload of the formatted data stream by different technologies and the present technology to format the raw data. An example of configuration suitable for the networking device 50 may be, without being limitative, as follows:

| | |
|---|---|
| Processor model name: | Intel (R) Xeon(R) CPU E5-2687W v4 @ 3.00 GHz |
| Model: | 79 |
| Architecture: | x86_64 |
| CPU op-mode(s): | 32-bit, 64-bit |
| CPU(s) | 48 |
| CPU family | 6 |
| CPU MHz: | 1199.600 |
| CPU max MHz: | 3500.000 |
| CPU min MHz: | 1200.000 |

Other configurations may also be used and will become readily apparent to the person skilled in the art of the present technology.

The raw data considered to perform the measurement of formatting time is a 4 GiB long file comprising 25% of non-sparse data segment. As it may be apparent to the person skilled in the art of the present technology, this file is a representation of a 25% full flash drive. The technologies in comparison are Xzip tool, QCOW2 compressed and uncompressed tool, Gzip, and Lz4. In order for the measurements to be a representation of a real use case, the raw data are located on a drive, formatted and uploaded on a network, downloaded and reconstructed on the drive. The configuration of the drive used for the measurements is, without being limitative, as follows:

| | |
|---|---|
| Model Number: | INTEL SSDPE2MX450G7 |
| Serial Number: | CVPF73620010450RGN |
| Firmware Version: | MDV10290 |
| Number of Namespaces: | 1 |
| Namespace 1 Size/Capacity: | 450,098,159,616 [450 GB] |

The present technology has a formatting and reconstructing time of 42.83 seconds, which is the same order of magnitude of the other known technologies.

Figure 14:
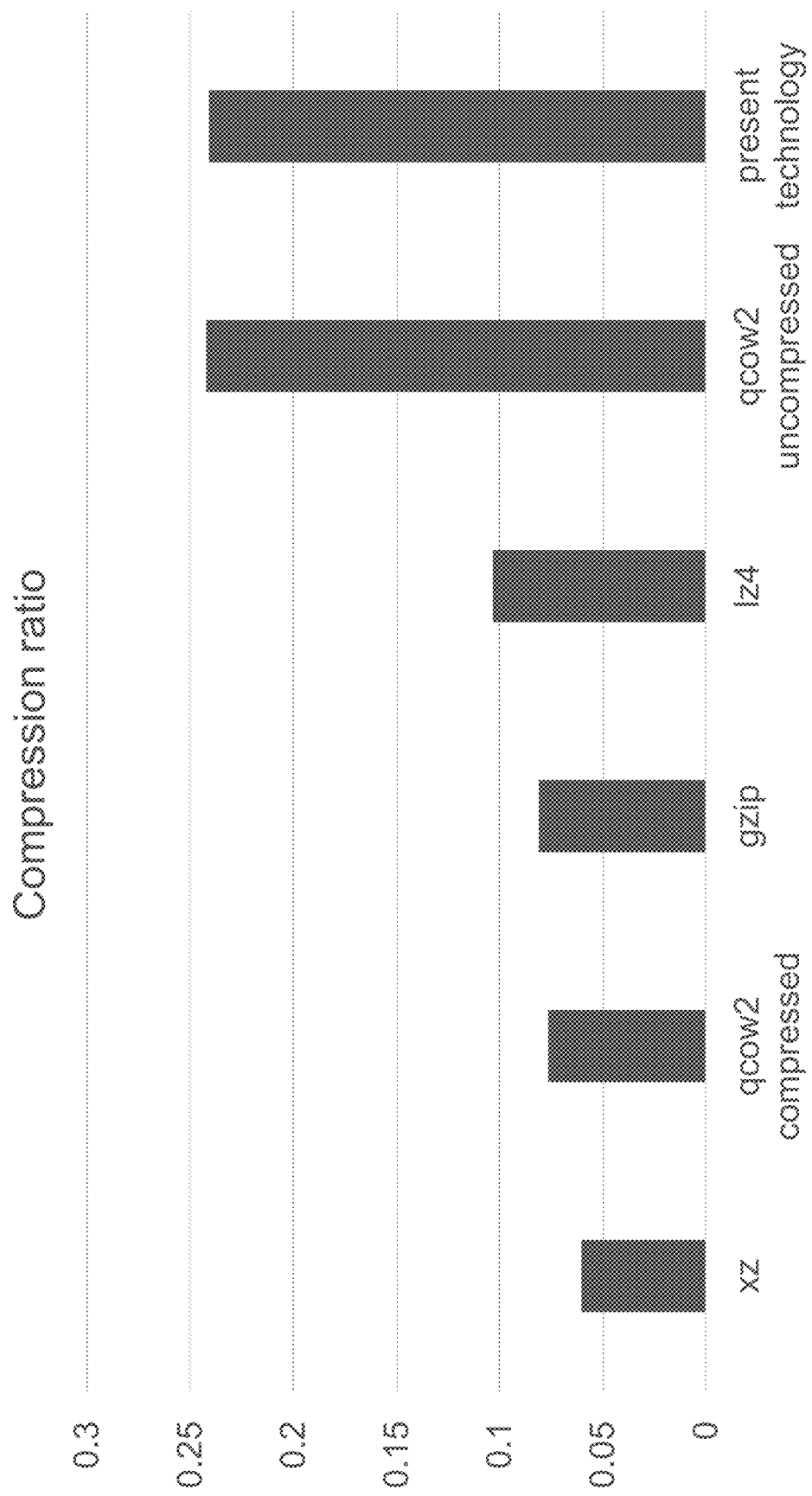
FIG. 14 is a comparison of the compression ratio of different known technologies versus the present technology.

Turning now to FIG. 14, a comparison of the compression ratio of the known technologies with the present technology is illustrated. The measurements have been made on the same 4 GiB long raw data file. The compression rate of the present technology is 0.24, corresponding to ratio of the number of written bytes over the number of read bytes during the process of formatting and reconstructing the raw data file.

Figure 15:
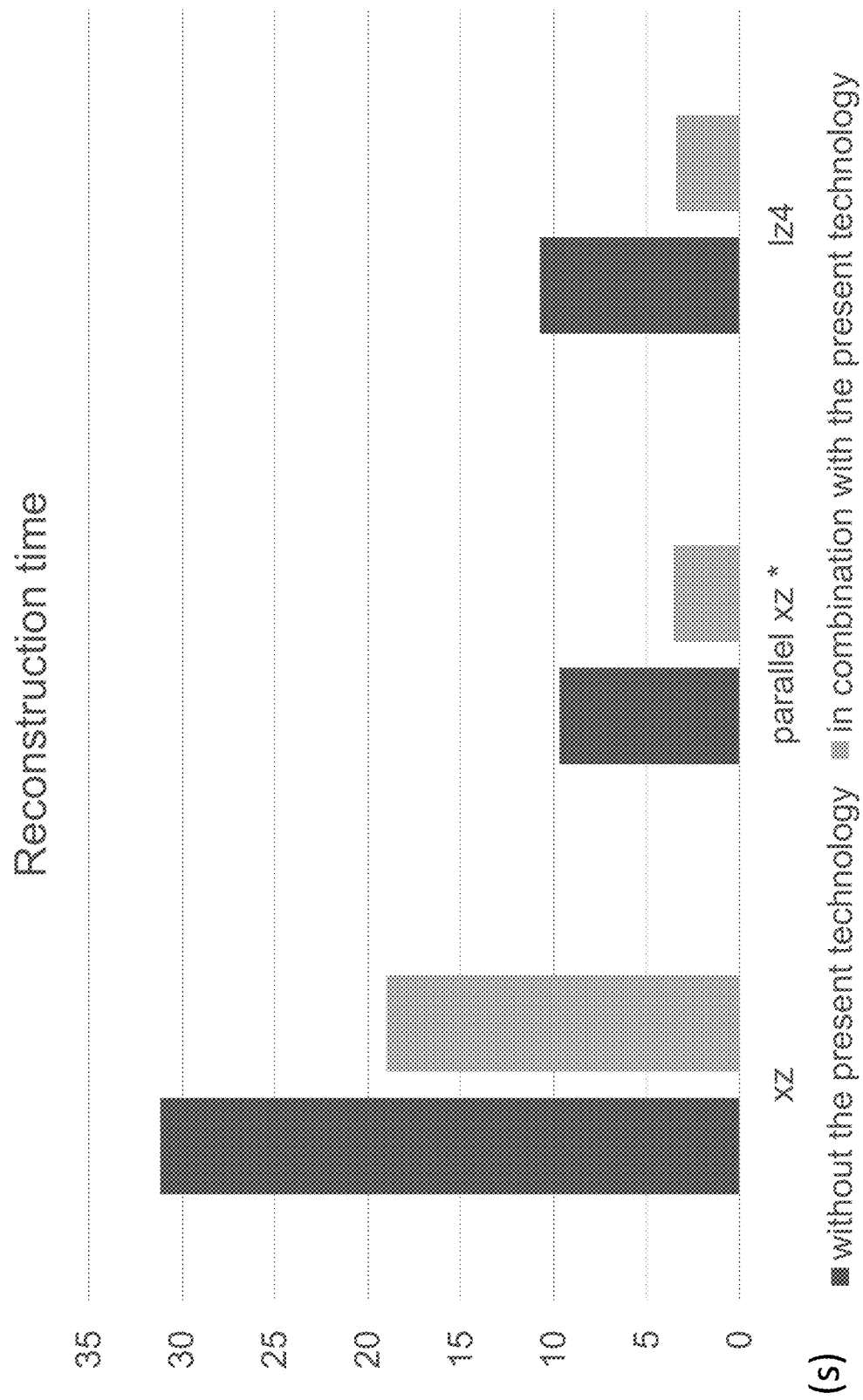
FIG. 15 is a comparison of the reconstructing time of raw data by known technologies and the reconstructing time of raw data by the same known technologies combined with the present technology.

As mentioned hereinabove, the present technology may be used in addition to standard known compression and decompression tools, such as Xzip, Parallel Xzip* and Lz4. The reconstruction times of raw data on the drive of these three technologies are compared to the reconstruction times of raw data on the drive of these three technologies combined with the present technology on FIG. 15. The present technology allows the Xzip tool, Parallel Xzip* tool and the Lz4 tool to perform respectively 39%, 65% and 67% faster in the reconstruction of the raw data.

Although the examples set forth in the present disclosure relates to formatted streamable disk-image and OS deployment on bare-metal servers, the present technology and methods may be used for other applications such as data file streaming and, more widely, data formatting and reconstruction in general. Multiple examples of how the present technology may be implemented will become apparent to the person skilled in the art.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of formatting raw data, comprising:
    accessing the raw data from a storage location on a first data storage device, the raw data containing sparse data segments and non-sparse data segments, the sparse data segments being empty of any data and the non-sparse data segments containing data;
    reading the accessed raw data to locate the sparse data segments and the non-sparse data segments;
    generating a formatted data stream comprising one or more formatted atomic blocks based on the read raw data, the one or more formatted atomic blocks having a maximum block size defined by a size of a destination device memory and associated with a metadata file, each one of the one or more formatted atomic blocks configured with a format that includes a field indicating a data size of the non-sparse data segments of the raw data, a field containing at least a portion of the non-sparse data segments, and a field containing the metadata file identifying specific beginning and end locations, in which the formatting of the one or more atomic blocks comprises:
    when one of the atomic blocks does not exceed the maximum block size:
        populate the metadata file of the one of the atomic blocks with offsets identifying a beginning of each of the located sparse data segments and an end of each of the located sparse data segments; and
        populate the one of the atomic blocks with a concatenation of at least a portion of a first non-sparse segment of the raw data located before the sparse segment with at least a portion of a second non-sparse data segment of the raw data located after the sparse data segment; and
    when one of the atomic blocks exceeds the maximum size:
        populate the metadata file of another one of the atomic blocks with offsets indicative of the beginning of the located sparse data segment and the end of the located sparse data segment; and populate the other one of the atomic blocks with a concatenation of the at least a portion of the first non-sparse data segment of the raw data located before the sparse data segment with the at least a portion of the second non-sparse data segment of the raw data located after the sparse data segment; and reconstructing the raw data on a second data storage device from the formatted data stream, the second data storage device being distinct from the first data storage device, the reconstructing being based on the metadata file, the reconstructing comprising:

browsing the metadata file; and iteratively reconstructing the raw data by writing a corresponding data content for each non-sparse data segment identified by the metadata file and executing a command to define a segment of zeros for each sparse data segment identified by the metadata file, wherein the segment of zeros comprises multiple zeros, wherein one atomic block is streamed from the first data storage device to the second data storage device while the generating of the formatted data stream and the iterative reconstructing of the raw data are being executed in parallel.

2. The method of claim 1, wherein a size of the segment of zeroes corresponds to a size of the corresponding sparse data segment.

3. The method of claim 1, wherein generating the formatted data stream further comprises generating a footer, the footer comprising a value relating to a number of the one or more formatted atomic blocks and being concatenated to the formatted data stream.

4. A method of formatting raw data, comprising:

accessing the raw data on a first data storage device, the raw data containing sparse data segments and non-sparse data segments, the sparse data segments being empty of any data and the non-sparse data segments containing data;

reading the raw data to locate the sparse data segments and the non-sparse data segments;

generating a formatted data stream based on the read raw data in which a size of the formatted data stream is limited by a size of a destination device memory, the formatted data stream comprising a field indicating a data size of the non-sparse data segments of the raw data, a field containing at least a portion of the non-sparse data segments, and a field containing a metadata file, the metadata file identifying specific locations of located sparse segments, wherein the generating comprises, upon locating one of the sparse data segments in the raw data, assembling the metadata file by:

populating the metadata file with offsets identifying a beginning of each of the located sparse data segments and an end of each of the located sparse data segments; and populating the metadata file by concatenating each of the located non-sparse segments in successive fashion of the raw data located between each sparse data segments; and reconstructing the raw data on a second data storage device from the formatted data stream, the second data storage device being distinct from the first data storage device, the reconstructing being based on the metadata file, the reconstructing comprising:

browsing the metadata file; and iteratively reconstructing the raw data by writing a corresponding data content for each non-sparse data segment identified by the metadata file and executing a command to define a segment of zeros for each sparse data segment identified by the metadata file, wherein the segment of zeros comprises multiple zeros, wherein the formatted data stream is streamed from the first data storage device to the second data storage device while the generating of the formatted data stream and the reconstructing of the raw data are being executed in parallel.

5. The method of claim 4, wherein a size of the segment of zeroes corresponds to a size of the corresponding sparse data segment.

6. The method of claim 4, wherein:

the raw data comprises data blocks and is reconstructed on a block device; and a command to define a block of zero which size corresponds to the size of the sparse segment is associated with the block device.

7. The method of claim 4, further comprising, prior to reconstructing the raw data from the formatted data stream, executing a decompression algorithm on the formatted data stream.

8. The method of claim 4, wherein the formatted data stream is streamed from a first data storage device to a second data storage device while the formatting of the raw data and the reconstructing of the raw data are being executed in parallel.

9. The method of claim 1, wherein generating the formatted data stream further comprises generating a footer, the footer comprising one or more of the following values: a number of read bytes of the raw data, a number of written bytes including written bytes of the metadata file and the footer, and/or a ratio between the number of read bytes and the number of written bytes; the footer being concatenated to the formatted data stream.

10. The method of claim 1, wherein the raw data comprises a disk-image containing a content and/or a structure of an entire data storage device.

11. The method of claim 1, further comprising, subsequent to generating the formatted data stream, executing a compression algorithm on the formatted data stream.

12. A networking device for Operating System (OS) deployment on a bare-metal server, the networking device being configured to perform the method of claim 1.

* * * * *